United States Patent
Côté et al.

(10) Patent No.: US 12,257,505 B2
(45) Date of Patent: Mar. 25, 2025

(54) VIDEO GAME WITH COACHING SESSION

(71) Applicant: SQUARE ENIX LTD., London (GB)

(72) Inventors: Carle Côté, Montreal (CA); Ugo Louche, Montreal (CA); Eric Martel, Montreal (CA); Romain Trachel, Montreal (CA)

(73) Assignee: SQUARE ENIX LIMITED, London (GB)

( * ) Notice: Subject to any disclaimer, the term of this patent is extended or adjusted under 35 U.S.C. 154(b) by 306 days.

(21) Appl. No.: 17/887,868

(22) Filed: Aug. 15, 2022

(65) Prior Publication Data

US 2023/0056715 A1  Feb. 23, 2023

(30) Foreign Application Priority Data

Aug. 23, 2021  (CA) ............................... CA3,128,825

(51) Int. Cl.
*A63F 13/5375* (2014.01)
*A63F 13/533* (2014.01)
*A63F 13/79* (2014.01)
*G06N 20/00* (2019.01)

(52) U.S. Cl.
CPC ........ *A63F 13/5375* (2014.09); *A63F 13/533* (2014.09); *A63F 13/79* (2014.09); *G06N 20/00* (2019.01)

(58) Field of Classification Search
None
See application file for complete search history.

(56) References Cited

U.S. PATENT DOCUMENTS

| 10,940,393 | B2 | 3/2021 | Somers et al. | |
| 2020/0384362 | A1* | 12/2020 | Shah | A63F 13/424 |
| 2021/0001229 | A1* | 1/2021 | Somers | A63F 13/67 |

OTHER PUBLICATIONS

Examiner's Report from the Canadian Intellectual Property Office in Canadian Patent Appl. No. 3,128,825, dated Aug. 25, 2023, four pages.
Examiner's Report from the Canadian Intellectual Property Office in Canadian Patent Appl. No. 3,128,825, dated May 29, 2024, five pages.

* cited by examiner

*Primary Examiner* — Jason T Yen
(74) *Attorney, Agent, or Firm* — Greenblum & Bernstein, P.L.C.

(57) ABSTRACT

A method of operating a computer for carrying out a video game is provided. The method includes maintaining a gaming environment in a non-transitory memory, with the gaming environment defining an autonomous agent and a behavioral model associated with the agent. The method also includes implementing a gaming session of the video game during which the agent carries out actions in accordance with the behavioral model, and implementing a coaching session of the video game by receiving instructions from a player. The instructions indicate a gameplay action to be performed by the agent in the gaming environment. The method also includes implementing the coaching session by receiving contextual feedback from the player regarding said gameplay action. The method also includes implementing the coaching session by adapting the behavioral model based on the instructions and the contextual feedback.

27 Claims, 28 Drawing Sheets

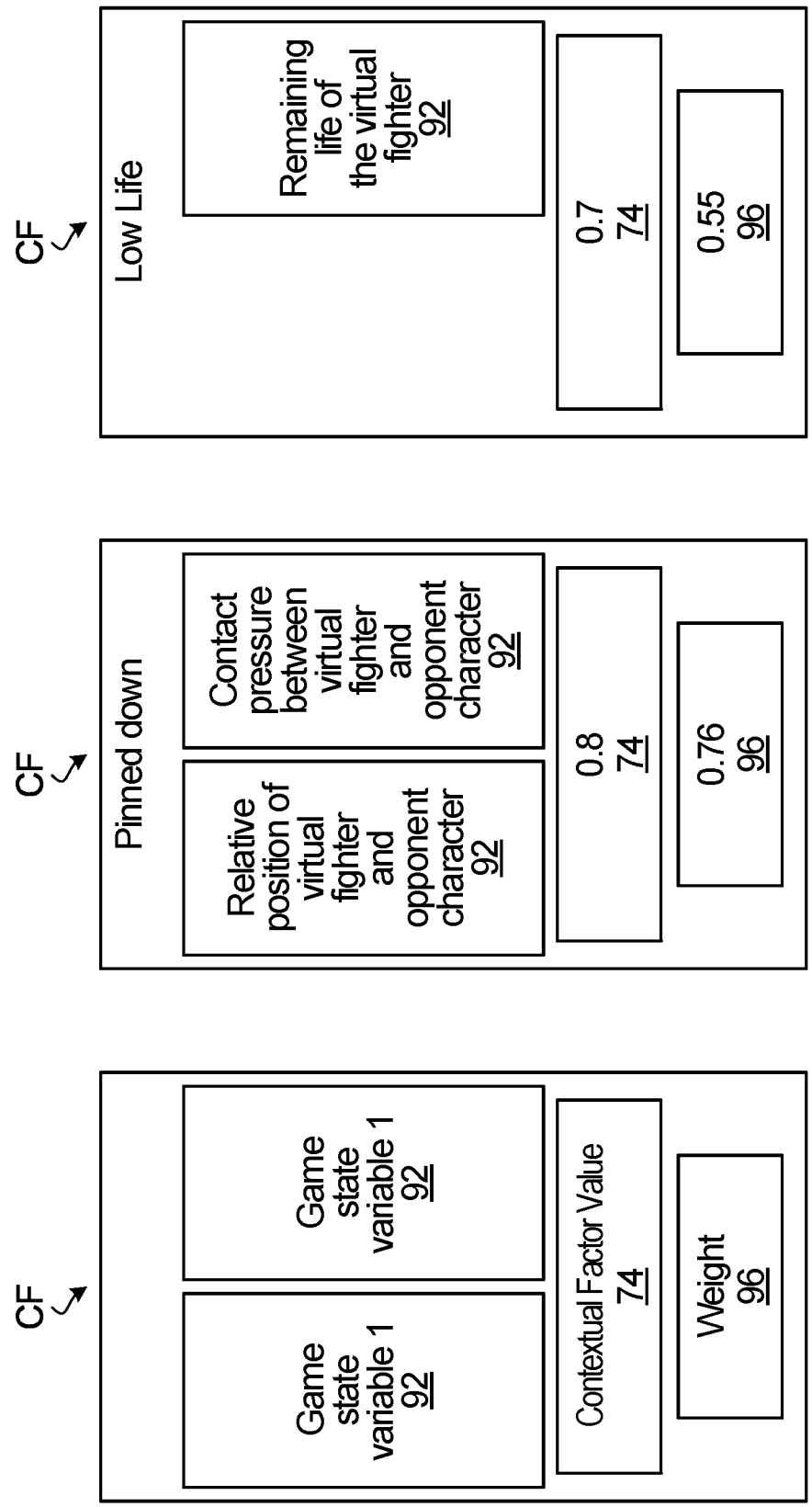

1200

```
┌─────────────────────────────────────────────────────────────────┐
│ Identifying the set of contextual factors associated with a given│
│           personalizable contextual parameter                    │
│                          1210                                    │
└─────────────────────────────────────────────────────────────────┘
                              │
                              ▼
┌─────────────────────────────────────────────────────────────────┐
│ Wherein the coaching session is a current coaching session preceded by
│  at least one previous coaching session in which previous instructions
│   indicative of a previous gameplay action to be performed by the player
│   character in the gaming environment and previous contextual feedback
│    from the player regarding the previous gameplay action have been
│  received, the previous instructions and contextual feedback are part of a
│    set of past player recommendations, and wherein generating the one or
│       more markers of inconsistences comprises generating one or more
│       markers of inconsistencies for each contextual factor in the set of
│  contextual factors based at least on a statistical analysis of the set of past
│                          player recommendations
│                                  1220                            │
└─────────────────────────────────────────────────────────────────┘
                              │
                              ▼
┌─────────────────────────────────────────────────────────────────┐
│      Storing the one or more markers of inconsistencies in memory│
│                            1230                                  │
└─────────────────────────────────────────────────────────────────┘
                              │
                              ▼
┌─────────────────────────────────────────────────────────────────┐
│    Requesting player input related to the one or more markers of │
│ inconsistencies and in response to the player input related to the one or
│  more markers of inconsistencies, modifying the set of contextual factors
│       associated with the given personalizable contextual parameter
│                              1240                                │
└─────────────────────────────────────────────────────────────────┘
```

FIG. 12

| Contextual Parameter 86 | Contextual Factor CF | Independence 46 | Importance 46 | Conflict 46 |
|---|---|---|---|---|
| Favorable Position | [Not] Long Remaining Time | 0.89 | 0.00 | 0.92 |
| [Not] Favorable Position | Pinned Down | 0.12 | 0.97 | 0.21 |
| [Not] Favorable Position | Slowed Down | 0.05 | 0.87 | 0.08 |
| Favorable Position | Low Life | 0.95 | 0.82 | 0.94 |
| [Not] Favorable Position | [Not] Long Remaining Time | 0.83 | 0.00 | 0.93 |
| Favorable Position | Long Remaining Time | 0.84 | 0.89 | 0.99 |

Favorable Position / [Not] Favorable Position 86

FIG. 13A

| Contextual Parameter 86 | Contextual Factor CF | Independence 46 | Importance 46 | Conflict 46 |
|---|---|---|---|---|
| Favorable Position | [Not] Long Remaining Time | 0.89 | 0.00 | 0.92 |
| [Not] Favorable Position | Pinned Down | 0.12 | 0.97 | 0.21 |
| [Not] Favorable Position | Slowed Down | 0.05 | 0.87 | 0.08 |
| Favorable Position | Low Life | 0.95 | 0.82 | 0.94 |
| [Not] Favorable Position | [Not] Long Remaining Time | 0.83 | 0.93 | 0.93 |
| Favorable Position | Long Remaining Time | 0.84 | 0.89 | 0.99 |

Favorable Position / [Not] Favorable Position 86

Unimportant — Contradiction — Contradiction — Redundant

FIG. 13B

*[Long] Remaining Time does not seem important, Can I forget about it?*

*Favorable Position + [Not] Long Remaining Time and [Not] Favorable Position + [Not] Long Remaining Time seem in contradiction, Is there a mistake?*

*There seems to be a lot of time left in the game, is there a mistake?*

*[Long] Remaining Time and Low Life seem in contradiction, Is there a mistake?*

Favorable Position / [Not] Favorable Position
86

| Contextual Parameter 86 | Contextual Factor CF | Independence 46 | Importance 46 | Conflict 46 |
|---|---|---|---|---|
| Favorable Position | [Not] Long Remaining Time | 0.89 | 0.00 | 0.92 |
| [Not] Favorable Position | Pinned Down | 0.12 | 0.97 | 0.21 |
| [Not] Favorable Position | Slowed Down | 0.05 | 0.87 | 0.08 |
| Favorable Position | Low Life | 0.95 | 0.82 | 0.94 |
| [Not] Favorable Position | [Not] Long Remaining Time | 0.83 | 0.93 | 0.93 |
| Favorable Position | Long Remaining Time | 0.84 | 0.89 | 0.99 |

1507  *Slowed Down and Pinned Down seem redundant, Can I ignore one?*

FIG. 15H

VIDEO GAME WITH COACHING SESSION

FIELD

The present disclosure relates generally to video games and, in particular, to video games that enable a player to coach a virtual character of the video game.

BACKGROUND

One of the main goals of a video game is to deliver a rewarding gaming experience, characterized by high levels of player engagement and interest.

Many video games involve interactions between a user of a computing device (a player) and a virtual character such as a player character (PC) (i.e., a virtual character under the player's control, such as a fighter, a pilot, a driver, etc.). These interactions typically involve the player controlling the PC within a virtual world in order to successfully progress through real-time challenges, thereby to advance gameplay.

Such video games often also include virtual characters such as non-player characters (NPCs) (i.e., autonomous computer-controlled agents). The player typically cannot control the actions of NPCs in a video game.

It thus remains that a virtual character's actions are either (i) largely controlled by inputs directly received from the player during active gameplay, in the case of a PC, or (ii) not at all controlled by the player, during active gameplay, in the case of an NPC. Thus leaves out a segment of the gaming market that would enjoy an element of strategy in training a virtual character to overcome the adversities present in an active video game environment without controlling the virtual character's actions by inputs.

Accordingly, there is an opportunity for a gaming genre wherein a player is challenged to train a virtual character to perform various tasks without directly controlling the virtual character by inputs. In this genre, the degree of customization of the virtual character by the player would extend beyond choosing attributes of the virtual character, such as physical characteristics, strength and skills; instead, the player would influence the "behavior" of the virtual character, i.e., the way in which the virtual character acts in the game environment.

SUMMARY

According to various aspects, this disclosure relates to a method of operating a computer for carrying out a video game. The method comprises maintaining a gaming environment in a non-transitory memory, the gaming environment defining an autonomous agent and a behavioral model associated with the player character. The method also comprises implementing a gaming session of the video game during which the player character carries out actions in accordance with the behavioral model. The method further comprises implementing a coaching session of the video game by receiving instructions from a player of the video game, the instructions indicative of a gameplay action to be performed by the agent in the gaming environment. The method also comprises implementing the coaching session of the video game by receiving contextual feedback from the player regarding said gameplay action. The method also comprises implementing the coaching session of the video game by adapting the behavioral model based on the instructions and the contextual feedback.

In accordance with another aspect, this disclosure relates to a non-transitory computer-readable storage medium comprising computer-readable instructions which, when read and executed by at least one processor, cause the at least one processor to execute a method of operating a computer for carrying out a video game, wherein the method comprises maintaining a gaming environment in a non-transitory memory, the gaming environment defining an autonomous agent and a behavioral model associated with the agent. The method also comprises implementing a gaming session of the video game during which the agent carries out actions in accordance with the behavioral model. The method further comprises implementing a coaching session of the video game by receiving instructions from a player of the video game, the instructions indicative of a gameplay action to be performed by the agent in the gaming environment. The method also comprises implementing the coaching session of the video game by receiving contextual feedback from the player regarding said gameplay action. The method also comprises implementing the coaching session of the video game by adapting the behavioral model based on the instructions and the contextual feedback.

In accordance with yet another aspect, this disclosure relates to a video game apparatus comprising at least one processor, a memory storing instructions for execution by the at least one processor and at least one input device configured to receive input from a player, at least one output device configured for providing output to the player. The at least one processor is configured to execute the instructions in the memory for implementing an interactive computer program that generates the output in response to the received input and, the interactive computer program including at least one process that comprises maintaining a gaming environment in a non-transitory memory, the gaming environment defining an autonomous agent and a behavioral model associated with the agent. The process also includes implementing a gaming session of the video game during which the agent carries out actions in accordance with the behavioral model. The process also includes implementing a coaching session of the video game by receiving instructions from a player of the video game, the instructions indicative of a gameplay action to be performed by the agent in the gaming environment. The process also includes implementing the coaching session of the video game by receiving contextual feedback from the player regarding said gameplay action. The process also includes implementing the coaching session of the video game by adapting the behavioral model based on the instructions and the contextual feedback.

These and other aspects of this disclosure will now become apparent to those of ordinary skill in the art upon review of a description of embodiments in conjunction with accompanying drawings.

BRIEF DESCRIPTION OF THE DRAWINGS

For a more complete understanding of the present disclosure, reference is now made to the following description taken in conjunction with the accompanying drawings, in which:

FIG. 7A conceptually illustrates sets of game state variables associated with a contextual factor of FIG. 5A, in accordance with a non-limiting embodiment;

FIGS. 7B and 7C are non-limiting examples of FIG. 7A as applied to a fighting video game, in accordance with a non-limiting embodiment;

FIG. 12 a flowchart illustrating steps of an inconsistency detection algorithm, in accordance with a non-limiting embodiment of the present disclosure;

FIGS. 13A and 13B show a statistical toolbox stored in a memory of the video game apparatus, in accordance with a non-limiting embodiment of the present disclosure;

FIGS. 15A to 15H illustrate a structured dialogue between the player and the coaching module of FIGS. 14A and 14B, in accordance with a non-limiting embodiment.

It is to be expressly understood that the description and drawings are only for purposes of illustrating certain embodiments and are an aid of understanding. They are not intended to and should not be limiting.

DETAILED DESCRIPTION

I. Video Game Apparatus

Figure 1A:
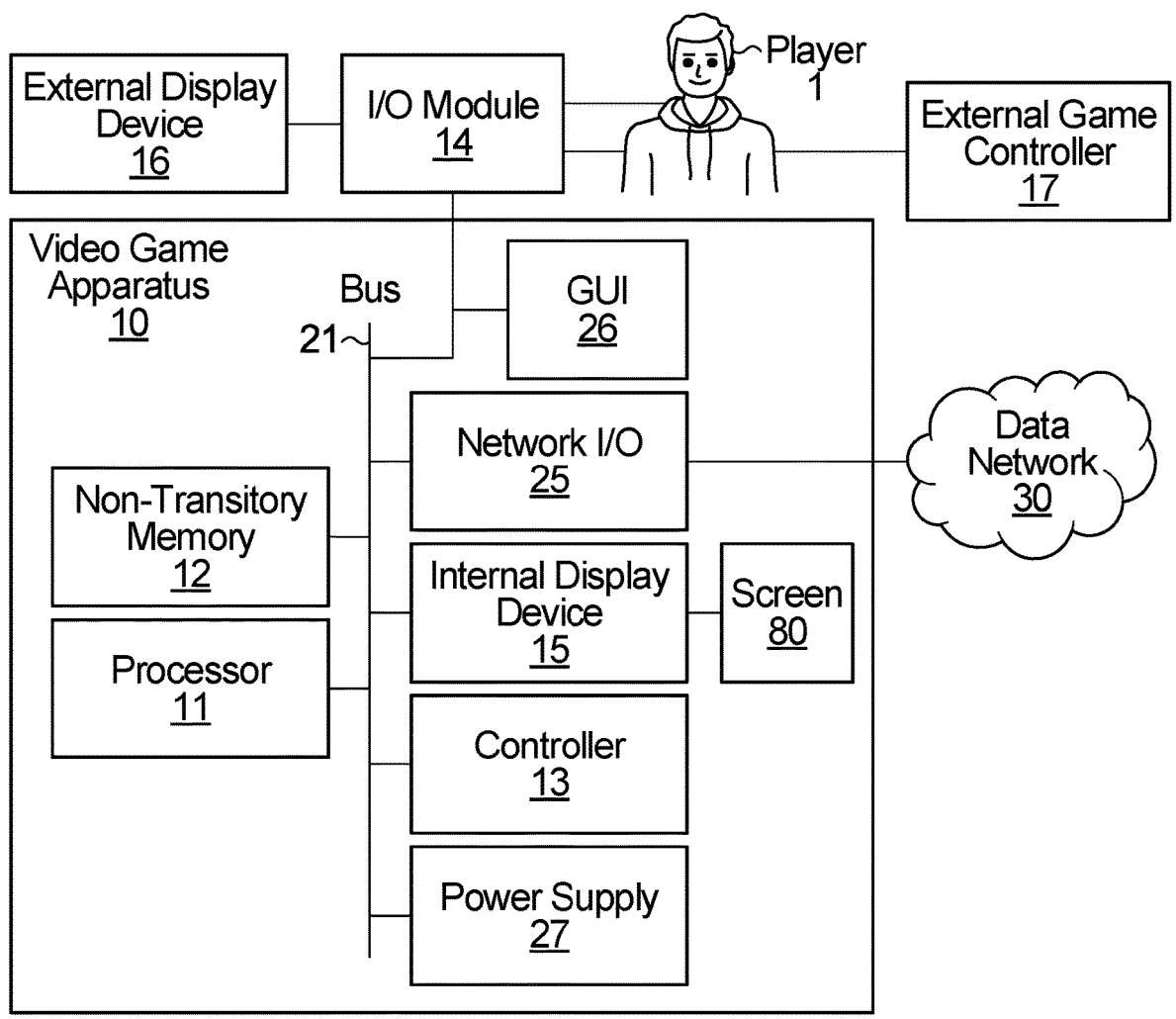
FIGS. 1A to 1D are block diagrams that illustrate various components and features of a video game apparatus for carrying out methods in accordance with various non-limiting embodiments of the present disclosure.

With reference to FIG. 1A, there is shown a video game apparatus 10. In some embodiments, the video game apparatus 10 is a dedicated gaming console similar to an Xbox™, Playstation™ or Nintendo™ gaming console. In other embodiments, the video game apparatus 10 is a computer such as a personal computer, a laptop computer etc. In yet other embodiments, the video game apparatus 10 is a mobile device such as a smartphone, a tablet. In yet other embodiments, the video game apparatus 10 is a hand-held gaming console. The video game apparatus 10 may be any other computing device suitable for carrying out the embodiments of the disclosure.

The video game apparatus 10 comprises a non-transitory memory 12, at least one processor 11, an input/output module 14 and a power supply 27, among other components.

In some embodiments, the video game apparatus 10 has a game control interface configured to receive input from a player 1 (i.e., a user of the video game apparatus 10). The game control interface may comprise an internal game controller 13 (e.g., a touchscreen) and/or an external game controller 17 (e.g., a joystick). The video game apparatus 10 also has a display apparatus configured to display images for the player 1 to see. The display apparatus may comprise an internal display device 15 (e.g., a touchscreen) and/or an external display device 16 (e.g. a computer monitor, a television set).

The video game apparatus 10 may be connected to a data network 30 via a network input/output interface 25. Depending on the implementation, the data network 30 may be the internet, a local area network, a wireless network, a combination of such networks or still other forms of data networks.

The various components of the video game apparatus 10 may communicate with each other over one or more buses 21, which can be data buses, control buses, power buses and the like.

Interactions between the player 1 and the video game apparatus 10 are known as "gameplay". For example, the player 1 may "play" a video game by viewing game images displayed on a screen 80 of the internal display device 15 or the external display device 16 and controlling aspects of the video game via the internal game controller 13 or the external game controller 17. Accordingly, the video game apparatus 10 receives inputs from the internal game controller 13 or the external game controller 17 via the input/output module 14. The video game apparatus 10 also supplies outputs to the internal display device 15 or the external display device 16 and/or an auditory device (e.g., a speaker, not shown) via the input/output module 14. In other implementations, there may be more than one internal or external game controller and/or more than one internal or external display device connected to the input/output module 14.

The at least one processor 11 may include one or more central processing units (CPUs) having one or more cores. The at least one processor 11 may also include at least one graphics processing unit (GPU) in communication with a video encoder/video codec (coder/decoder, not shown) for causing output data to be supplied to the input/output module 14 for display on the internal display device 15 or the external display device 16. The at least one processor 11 may also include at least one audio processing unit in communication with an audio encoder/audio codec (coder/decoder, not shown) for causing output data to be supplied to the input/output module 14 to the auditory device.

The memory 12 may include RAM (Random Access Memory), ROM (Read Only Memory), flash memory, hard disk drive(s), Flash Memory, EEPROM, Optical Disk and/or any other suitable memory device, technology or configuration. The memory 12 stores a variety of information including computer-readable instructions 18 (game code), game data 20 and an operating system 22.

When the video game apparatus 10 is powered on, the at least one processor 11 is configured to run a booting process which includes causing the at least one processor 11 to communicate with the memory 12. In particular, the booting process causes execution of the operating system 22. The operating system 22 may be any commercial or proprietary operating system suitable for the video game apparatus 10. Execution of the operating system 22 causes the at least one processor 11 to generate images displayed on the internal display device 15 or the external display device 16, including various options that are selectable by the player 1 via the internal game controller 13 or the external game controller 17, including the option for the player 1 to start and/or select a video game to be played. The video game selected/started by the player 1 is encoded by the game code 18.

The at least one processor 11 is configured to execute the game code 18 such that the at least one processor 11 is able to perform various kinds of information processing functions related to the video game that it encodes. In particular, and with reference to FIG. 1B, execution of the game code 18 causes the at least one processor 11 to execute a game data processing function 23 and game rendering function 24, which are now described.

The game rendering function 24 includes generation of a game image to be displayed on the internal display device 15 or the external display device 16. For its part, the game data processing function 23 includes processing of information representing progress of the game or a current state of the game (e.g., processing of information relating to the game that is not necessarily displayed on the internal display device 15 or the external display device 16). The game data processing function 23 may sometimes be referred to as "game logic".

Figure 1B:
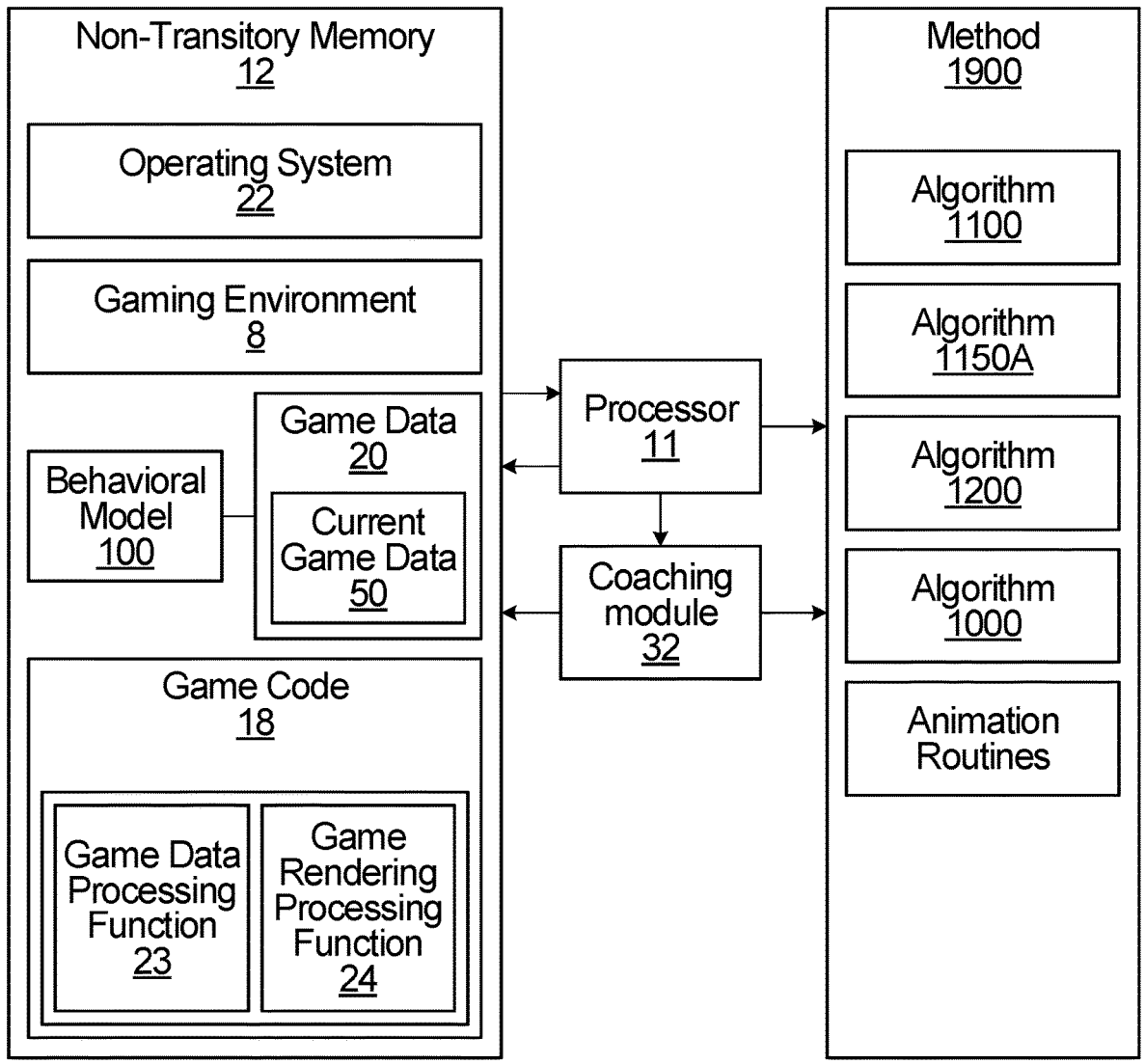

The game data processing function 23 and the game rendering function 24 are illustrated in FIG. 1B as forming part of a single set of computer-readable instructions 18. However, in other embodiments, the game data processing function 23 and the game rendering function 24 may be separate programs or sets of computer-readable instructions stored in separate memories and executed by separate, possibly distant, processors. For example, the game data processing function 23 may be performed on a CPU and the game rendering function 24 may be performed on a GPU.

Figure 1C:
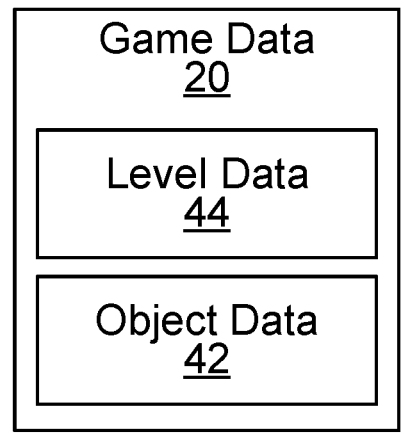

In the course of executing the game code 18, the at least one processor 11 manipulates constructs such as game objects and/or levels according to certain game rules and/or applying certain artificial intelligence algorithms. In the course of executing the game code 18, the at least one processor 11 creates, loads, stores, reads and generally accesses the game data 20, which includes data related to the game objects and/or levels. FIG. 1C shows an example illustrating examples of game data 20 according to a present example embodiment. The game data 20 may include data related to the aforementioned constructs and therefore may include object data 42 and/or level data 44.

A game object may refer to any element or portion of an element in a gaming environment that can be displayed graphically in a game image frame. Various types of game objects include a player character (PC), a non-player character (NPC), a player-controlled game object (such as a weapon) and an environment object, to name a few non-limiting possibilities. One game object may be associated with one or more other game objects, such as weapons held/controlled by a PC, or clothes donned by an NPC, or a formation of NPCs associated with a PC. A game object may have other non-visual representations such as numeric, geometric or mathematical representations. The object data 42 may store data relating to the current representation of a game object such as the graphical representation in a game image frame or a numeric, geometric or mathematical representation.

The object data 42 may store attributes of various game objects. In some cases, certain attributes of a game object may be controlled by the player 1. In other cases, certain attributes of a game object may be controlled by the game code 18. Non-limiting examples of attributes may include imaging data, position data, orientation data, material/texture data, color data, physical state data, visibility data, lighting data (e.g., direction, position, color and/or intensity), sound data, motion data, collision data, environment data, timer data and/or other data associated with the game object.

The game data 20 may also include data relating to the current view or camera angle of the video game (e.g., first-person view, third-person view, etc.) as displayed on the screen 80 of the internal display device 15 or the external display device 16 which may be part of the representations and/or attributes of the object data 42 and/or the level data 44.

In executing the game code 18, the at least one processor 11 may cause an initialization phase to occur after the player 1 has selected/started the game, causing initialization of the game. The initialization phase is used to carry out any necessary game setup and prepare the game data 20 for the start of the game. The game data 20 changes during the processing of the game code 18 (i.e., during the playing of the game) and the terminology "game state" is used herein to define the current state or properties of the game data 20 and hence the various object data 42 and/or the level data 44 and their corresponding representations and/or attributes.

After the initialization phase, the at least one processor 11, in the course of execution of the game code 18, may implement a "game loop". The game loop may include (i) the game data processing function 23 being performed to process the player's input via the internal game controller 13 or the external game controller 17 and to update the game state (e.g., change data stored and maintained in the memory 12 regarding the gaming environment) and (ii) the game rendering processing function 24 being performed to cause the game image to be rendered based on the updated game state for display on the internal display device 15 or the external display device 16. The game loop may also track the passage of time to control the rate of gameplay.

The game loop runs continuously during gameplay causing the game data processing function 23 and the game rendering function 24 to be performed over and over again, but with a constantly changing game state.

It should be appreciated that parameters other than player inputs can influence the game state. For example, various timers (e.g., elapsed time, time since a particular event, virtual time of day, etc.) can have an effect on the game state. In other words, the game keeps progressing even when the player 1 does not provide input, and as such, the game state may be updated in the absence of the player's input.

In general, the number of times that the game data processing function 23 is performed per second specifies the game state update rate (hereinafter "updates per second") and the number of times that the game rendering function 24 is performed per second specifies game image rendering rate (hereinafter "frames per second"). It should be appreciated that the target number of frames per second may be more or less than 25 frames per second (e.g., 30 or 60 frames per second); however, it may be desired that the game data processing function 23 and the game rendering processing function 24 be performed not less than 20 to 25 times per second lest the human eye notice any lag in the rendering of the game image frames. Naturally, the higher the frame rate, the less time between images and the more power is required of the processor(s) to execute the game loop.

The game data processing function 23 and the game rendering function 24 may be called the same number of times per second, although this is not a requirement. By way of a specific and non-limiting example, it may be desirable to perform the game data processing function 23 and the game rendering function 24 every 40 milliseconds (ms) (i.e., 40 ms=1 second/25 frames per second—FPS). In the case where the game data processing function 23 is followed by the game rendering function 24, it should be appreciated that, for a given cycle or period, both the game data processing function 23 and the game rendering function 24 would need to be performed in the allotted time for that period. Depending on the current game state, it should be appreciated that the time required to perform the game data processing function 23 and/or the game rendering function 24 may vary. If both the game data processing function 23 and the game rendering function 24 together take less than the allotted time, a sleep timer may be used before performing the next cycle of the game data processing function 23 and the game rendering function 24. However, if the game data processing function 23 and the game rendering function 24 together take more than the allotted time to perform, this may cause jitter. One technique to avoid jitter is to occasionally omit performing the game data processing function 23 or the game rendering function 24.

In other embodiments, the game data processing function 23 and the game rendering function 24 may be independently executed processes, i.e., not part of the same game loop. In such cases, the game data processing function 23 may be routinely performed at a specific rate (i.e., a specific number of updates per second) regardless of when the game rendering function 24 is performed and the game rendering function 24 may be routinely performed at a specific rate (i.e., a specific number of frames per second) regardless of when the game data processing function 23 is performed.

It should be appreciated that the process of routinely performing the game data processing function 23 and the game rendering function 24 may be implemented according to various techniques within the purview of the person skilled in the art. The techniques described in this document are simply non-limiting examples of how the game data processing function 23 and the game rendering processing function 24 may be performed.

As part of performing the game data processing function 23, the player input received via the internal game controller 13 or the external game controller 17 (if any) and the game data 20 are processed. More specifically, as the player 1 plays the video game, the player 1 inputs various commands via the internal game controller 13 or the external game controller 17 such as move left, move right, move front, move back, jump, shoot, to name a few examples. In response to the received player input, the game data processing function 23 may update the game data 20. In other words, the object data 42 and/or the level data 44 may be updated in response to player input received via the internal game controller 13 or the external game controller 17.

It should be appreciated that on some occasions when the game data processing function 23 is performed, there may not be any player input received via the internal game controller 13 or the external game controller 17.

Regardless of whether or not player input is received, the game data 20 is processed and may be updated. Such updating of the game data 20 may be in response to representations and/or attributes of the object data 42 and/or the level data 44 as the representations and/or attributes may specify updates to the game data 20. For example, timer data may specify one or more timers (e.g., elapsed time, time since a particular event, virtual time of day, etc.), which may cause the game data 20 (e.g., the object data 42 and/or the level data 44) to be updated. By way of another example, objects not controlled by the player 1 may collide (bounce off, merge, shatter, etc.), which may cause the game data 20 e.g., the object data 42 and/or the level data 44 to be updated in response to a collision.

In general, the game data 20 (e.g., the representations and/or attributes of the objects and/or levels) represents data that specifies a three-dimensional (3D) graphics scene of the game. The process of converting a three-dimensional (3D) graphics scene, which may include one or more 3D graphics objects, into two-dimensional (2D) rasterized game image for display on the internal display device 15 or the external display device 16 is generally referred to as rendering and is carried out by the game rendering function 24.

Figure 1D:
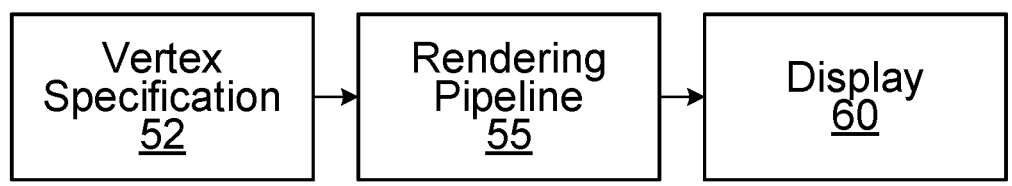

FIG. 1D illustrates an example of a process of converting a 3D graphics scene to a game image for display on the internal display device 15 or the external display device 16 via the screen 80. At step 52, the game rendering function 24 processes the data that represents the three-dimensional (3D) graphics scene of the game and converts this data into a set of vertex data (also known as a vertex specification). The vertex data is suitable for processing by a rendering pipeline (also known as a graphics pipeline). At step 55, the game rendering function 24 processes the vertex data according to the rendering pipeline. The output of the rendering pipeline is typically pixels for display on the internal display device 15 or the external display device 16 via the screen 80 (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering function 24 processes the vertex data according to the rendering pipeline. Non-limiting examples of known rendering pipelines include OpenGL and DirectX. Regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to 2D screen space and performs various processing which may take into consideration lighting, colour, position information, texture coordinates and/or any other suitable process to derive the game image (e.g., pixels) for output on the internal display device 15 or the external display device 16 (step 60).

In other embodiments, the video game apparatus 10 may be distributed across multiple geographical locations, for example, across multiple devices including configurations where the multiple devices communicate over a network (e.g., the internet), such that the game process and the rendering process may be split over multiple processors across the multiple devices. For example, in some cases, the video game apparatus 10 may be distributed between a server on the internet and one or more internet appliances or may comprise multiple cloud-based servers. Multiple players may therefore participate in the same video game, and the functionality of the game program (the game rendering processing function and/or the game data processing function) may be executed at least in part by the server. Therefore, in summary, when executing the game code 18, the video game apparatus 10 is caused to (i) maintain a gaming environment 8 stored in then non-transitory memory 12, the gaming environment 8 comprising various game objects; (ii) track attributes of the game objects in the gaming environment 8; (iii) render images for display based on the game objects in the gaming environment 8 and one or more camera perspectives; (iv) be attentive to input from the player; and (v) respond to the input by making changes to the attributes of the game objects in the gaming environment 8.

II. Overview

In accordance with embodiments of the present disclosure, by executing the game code 18, the video game apparatus 10 implements two distinct phases, which can be referred to as a "coaching session" and a "gaming session".

During the gaming session, rather than being controlled by inputs directly received from the player 1 (e.g., via the internal game controller 13 and/or the external game controller 17), an autonomous agent (e.g., a virtual entity such as a non-player character (NPC), a virtual vehicle, etc.; an autonomous entity or an intelligent entity such as an intelligent agent, an artificial agent, etc.; or an artificial intelligence (AI) director, to list a few non-limiting examples) carries out actions in accordance with a "behavioral model" 100 associated with the agent. The agent and the behavioral model 100 are part of the gaming environment 8 maintained by the video game apparatus 10.

Figure 2A:
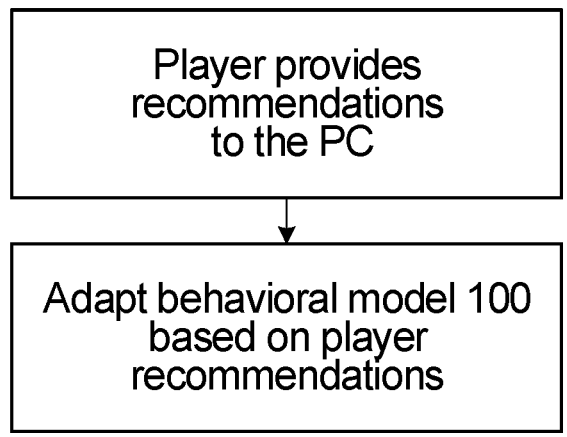
FIG. 2A is a block diagram that illustrates aspects of a coaching session of the video game, in accordance with a non-limiting embodiment.

For its part, the coaching session is used to adapt the behavioral model 100 used in the subsequent gaming session. In this regard, during the coaching session, the agent is "coached" by the player 1, which includes the video game apparatus 10 receiving recommendations from the player 1, as shown in FIG. 2A. The nature of the interaction between the video game apparatus 10 and the player 1 gives the player 1 the illusion that the player 1 is making recommendations to the agent.

The greater the level of sophistication of the coaching session, the more consistent the "behavior" exhibited by the agent in the gaming session will be with the player's own decision-making process (as expressed by the aforesaid recommendations), which could lead to increased player satisfaction.

In some embodiments, the video game apparatus 10 may implement a single coaching session before implementing a gaming session. In other embodiments, multiple coaching sessions may be implemented before implementing a gaming session. In yet other embodiments, a coaching session may be followed by multiple gaming sessions.

For the purposes of the present description, aspects of this disclosure will be described below with respect to a non-limiting example in which the video game is of the "fighting video game" genre and the agent is a virtual fighter. Accordingly, the gaming environment 8 defines the virtual fighter, a behavioral model 100 associated with the virtual fighter, and an opponent character against whom the virtual fighter is to fight. It is understood, however, that various aspects to be described below can be applied to other video game genres and non-gaming virtual environments, or any other suitable applications.

The gaming environment 8 also defines current game data 50. In this case, the current game data 50 is a subset of the game data 20 at a time T in the fighting session. The current game data 50 can include game data related to character states, character actions, environmental states, positional information about objects and/or characters in the video game, non-positional information about characters and/or objects in the video game, speeds, directions, health and other attributes, game modes, levels, and/or other information associated with the video game. For example, the current game data 50 may include, for each of the potentially many virtual characters interacting in the gaming environment 8 (such as PCs and NPCs), character position, character orientation, current character action, attributes, and/or other information with the video game. The current game data 50 can include dynamic state information that continually changes, such as character movement positions, and static state information, such as the identification of a game level or map within the game. The current game data 50 may include other information that depends on the type of game and other factors.

In some embodiments, at least a portion of the current game data 50 is determined or collected in a continuous fashion. In other embodiments, at least a portion of the current game data 50 is determined or collected on a periodic basis, such as multiple times per second. In yet other embodiments, the current game data 50 is determined or collected on an event-based basis.

In the context of the presently described fighting video game, the gaming session is a "fighting session" during which the virtual fighter carries out actions, within the gaming environment 8, against the opponent character. These actions are carried out in accordance with the behavioral model 100 associated with the virtual fighter. The behavioral model 100 will have been adapted by the player 1 during one or more prior coaching sessions (to be described hereinbelow). During the coaching session, the opponent character may be a computer-controlled virtual entity or a PC controlled by another player. Alternatively, during the coaching session, the opponent character may be an agent associated with another player, in which case the opponent character may in fact be coached by another player in a similar fashion as is being described with respect to the virtual fighter associated with the player 1. During the fighting session, the opponent character may be a PC controlled by the player or by another player, an agent coached by another player or a computer-controlled virtual entity. These example opponent characters are not intended to be limiting. It should also be understood that there is no particular limit as to the number of opponent characters against which the virtual fighter must fight.

During the fighting session, the virtual fighter may autonomously carry out a performable gameplay action A of a plurality of performable gameplay actions 72. Examples of performable gameplay actions A in a fighting video game may include "flee", "punch", "heal", "jump", "shoot", "use special power", "stay close", to name a few non-limiting possibilities. Each of performable gameplay action A of the plurality of performable gameplay actions 72 may be associated with an animation routine which can be initiated by the at least one processor 11 of the video game apparatus 10 when it is determined that such particular performable gameplay action A is to be carried out by the virtual fighter.

Figure 3:
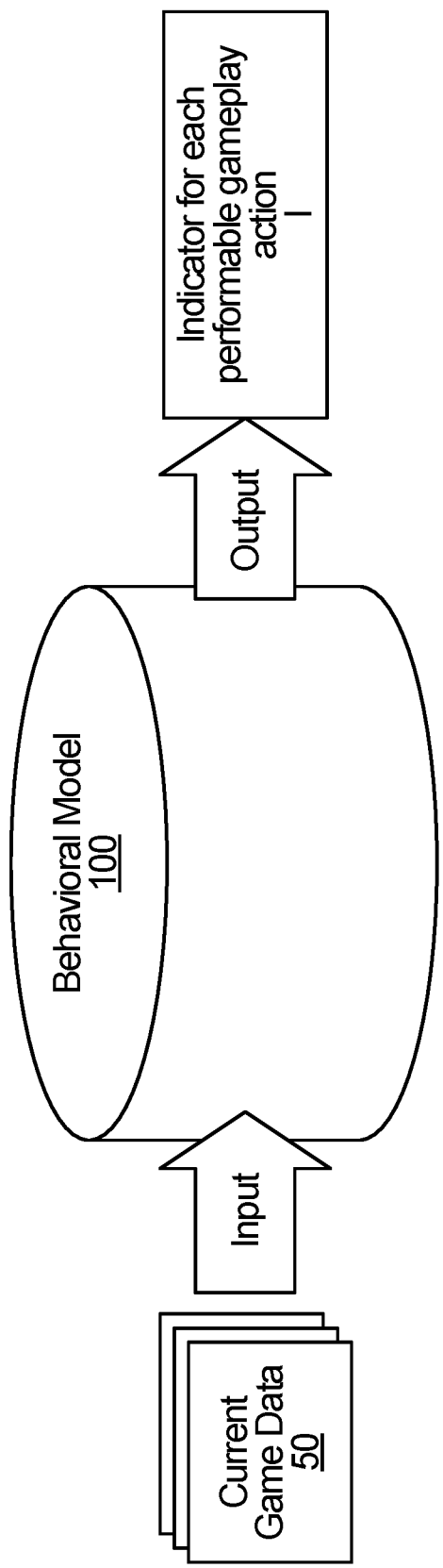
FIGS. 3 and 4 conceptually illustrate inputs and outputs of a behavioral model associated with an agent of the video game, in accordance with a non-limiting embodiment.
Figure 4:
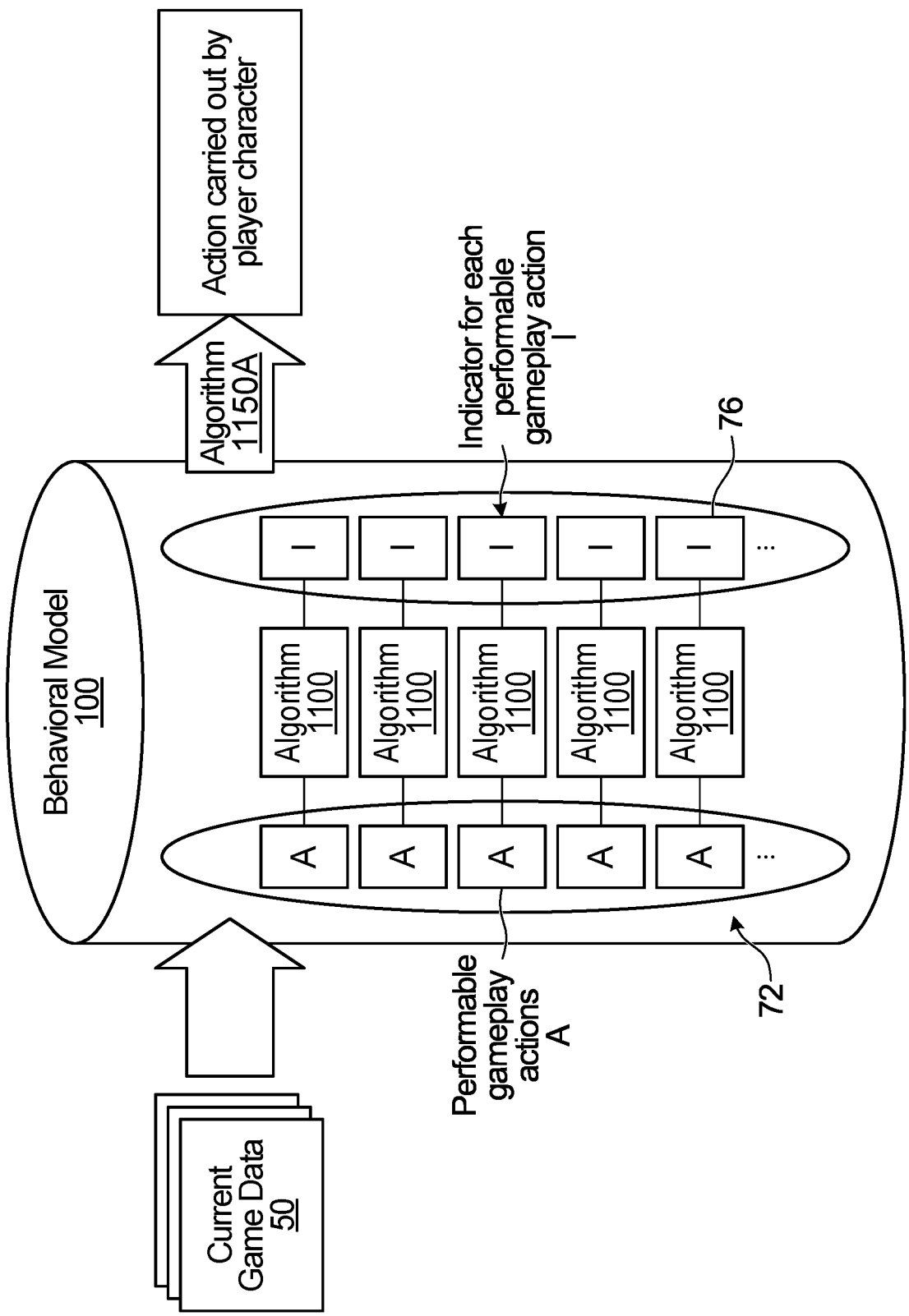

As shown in FIGS. 3 and 4, the behavioral model 100 has inputs and outputs. The inputs of the behavioral model 100 are taken from the current game data 50, which was described above. The outputs of the behavioral model 100 comprise an indicator I for each performable gameplay action A of the plurality of performable gameplay actions 72. The indicator I for each performable gameplay action A of the plurality of performable gameplay actions 72 may be stored in the non-transitory memory 12.

In this example of implementation, as shown in FIG. 4, the behavioral model 100 is configured to compute the indicator I for each performable gameplay action A of the plurality of performable gameplay actions 72 based on the current game data 50. The indicator I for a particular performable gameplay action A may be referred to as a "preference score" 76 associated with that particular performable gameplay action A. The preference score 76 may be understood as a representation of the player's preference for a particular performable gameplay action A according to a given context, the preference being characterized by the behavioral model 100 adapted to reflect a player's decision-making process as learned from the prior coaching session. The preference score 76 may further be understood as a measure of the utility of a particular performable gameplay action A, the utility being determined for a given context as defined by the current game data 50; in this way, the preference score 76 may also be referred to as a "utility score".

The preference score 76 may be configured as any metric that lends itself to numerical comparison. For example, depending on the embodiment, the preference score 76 may be configured as an integer value, a fractional value, a percentual value, etc.

Figure 9:
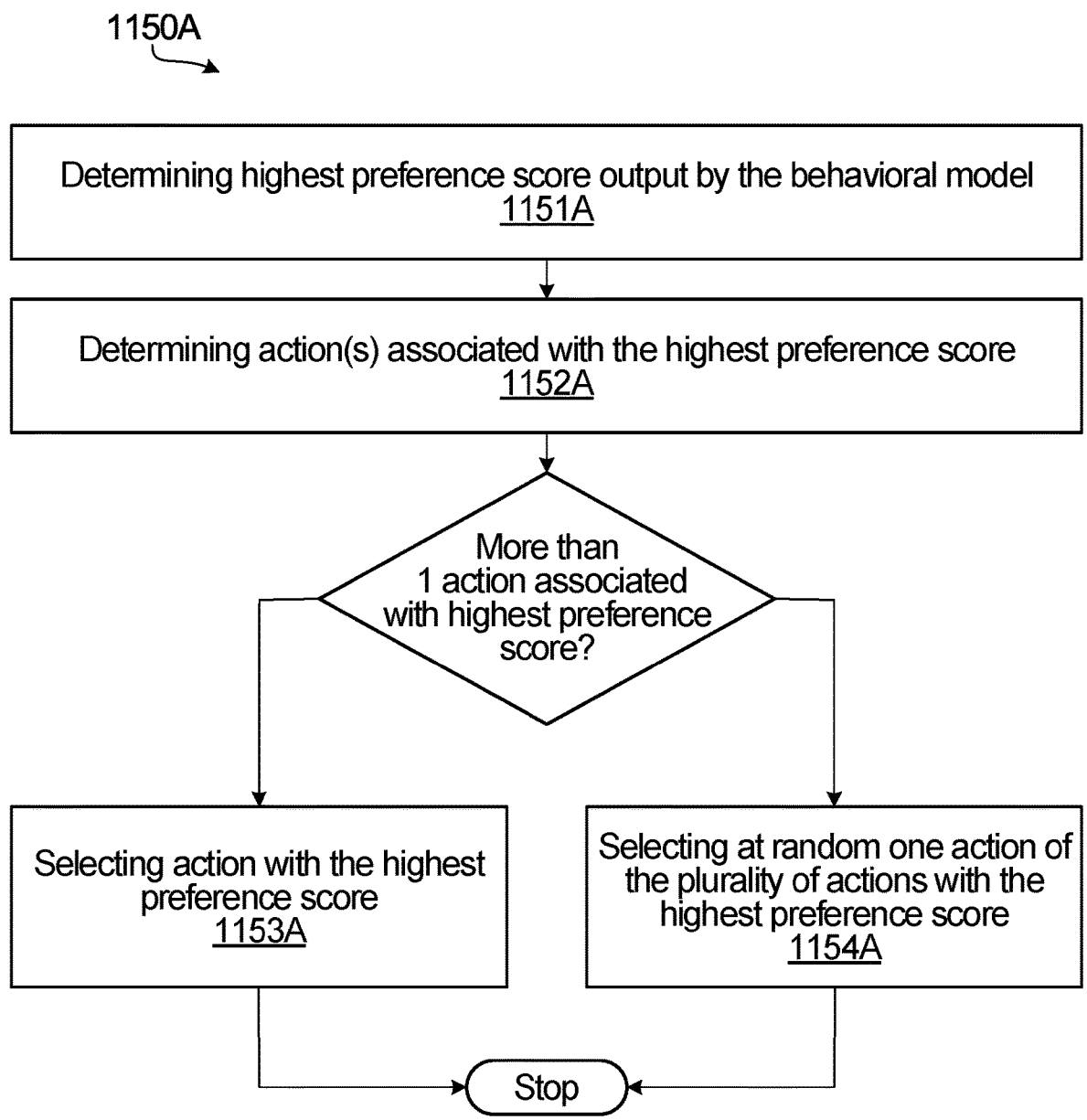
FIG. 9 is a flowchart illustrating steps of a performable gameplay action determination algorithm, in accordance with a non-limiting embodiment of the present disclosure.

During the fighting session, the game code 18 is configured to identify the performable gameplay action A having the highest preference score 76 (according to a performable gameplay action determination algorithm 1150A) and the virtual fighter is caused to carry out the performable gameplay action A so identified. Reference is now made to the flowchart in FIG. 9 showing steps of the algorithm 1150A executed by the at least one processor 11 according to which the performable gameplay action A having the highest preference score 76 is determined.

Specifically, at step 1151A, the highest preference score 76 as output by the behavioral model 100 is determined. The highest preference score 76 may be associated with one or more performable gameplay actions A of the plurality of performable gameplay actions 72 (e.g., two or more performable gameplay actions A may be tied for the highest preference score 76). Thus, at step 1152A, one or more performable gameplay actions A associated with the highest preference score 76 are identified. If only one performable gameplay action A has been identified, the algorithm 1150A proceeds to step 1153A in which the performable gameplay action A with the highest preference score 76 is selected. If, on the other hand, two or more actions are tied for the highest preference score 76, any one of these two or more performable gameplay actions A may be selected (e.g., at random) at step 1154A.

In some embodiments, the preference score 76 for each performable gameplay action A of the plurality of performable gameplay actions 72 is computed continuously throughout the fighting session. In other embodiments, the preference score 76 for each performable gameplay action A of the plurality of performable gameplay actions 72 is computed on a periodic basis, such as multiple times per second. In yet other embodiments, the preference score 76 for each performable gameplay action A of the plurality of performable gameplay actions 72 is computed on an event-based basis.

In some cases, during the fighting session, the virtual fighter may be in the midst of carrying out a performable gameplay action A having the highest preference score 76 only to change course, mid-action, to a different performable gameplay action A having the highest preference score 76. Accordingly, the at least one processor 11 need not wait until a previous performable gameplay action A is completed to recompute the preference score 76 for each performable gameplay action A of the plurality of performable gameplay actions 72 and determine a new highest preference score 76.

As mentioned above, each performable gameplay action A may involve the game code 18 running an associated animation routine. This animation routine has a certain respective duration. Thus, it is possible that during the time that the animation routine associated with a first performable gameplay action A is running (because the first performable gameplay action A was found to have the highest preference score 76), a second performable gameplay action A may be identified as having the highest preference score 76. At this point, depending on the embodiment, either the animation routine associated with the first performable gameplay action A is interrupted and the animation routine associated with the second performable gameplay action A is commenced, or the game code 18 is configured to wait until the animation routine associated with the first performable gameplay action A ends, at which point the game code 18 may recompute the preference score 76 for each performable gameplay action A and determine which performable gameplay action A has the highest preference score 76.

III. Computation of the Preference Score 76

The preference score 76 associated with a particular performable gameplay action A is computed based on a set of "contextual parameters" 84 associated with that particular performable gameplay action A. As such, the behavioral model 100 is configured to output a preference score 76 for each performable gameplay action A of the plurality of performable gameplay actions 72 based on the set of contextual parameters 84 associated with that particular performable gameplay action A. The set of contextual parameters 84 is stored in the memory 12 of the video game apparatus 10 as part of the behavioral model 100.

Figure 5A:
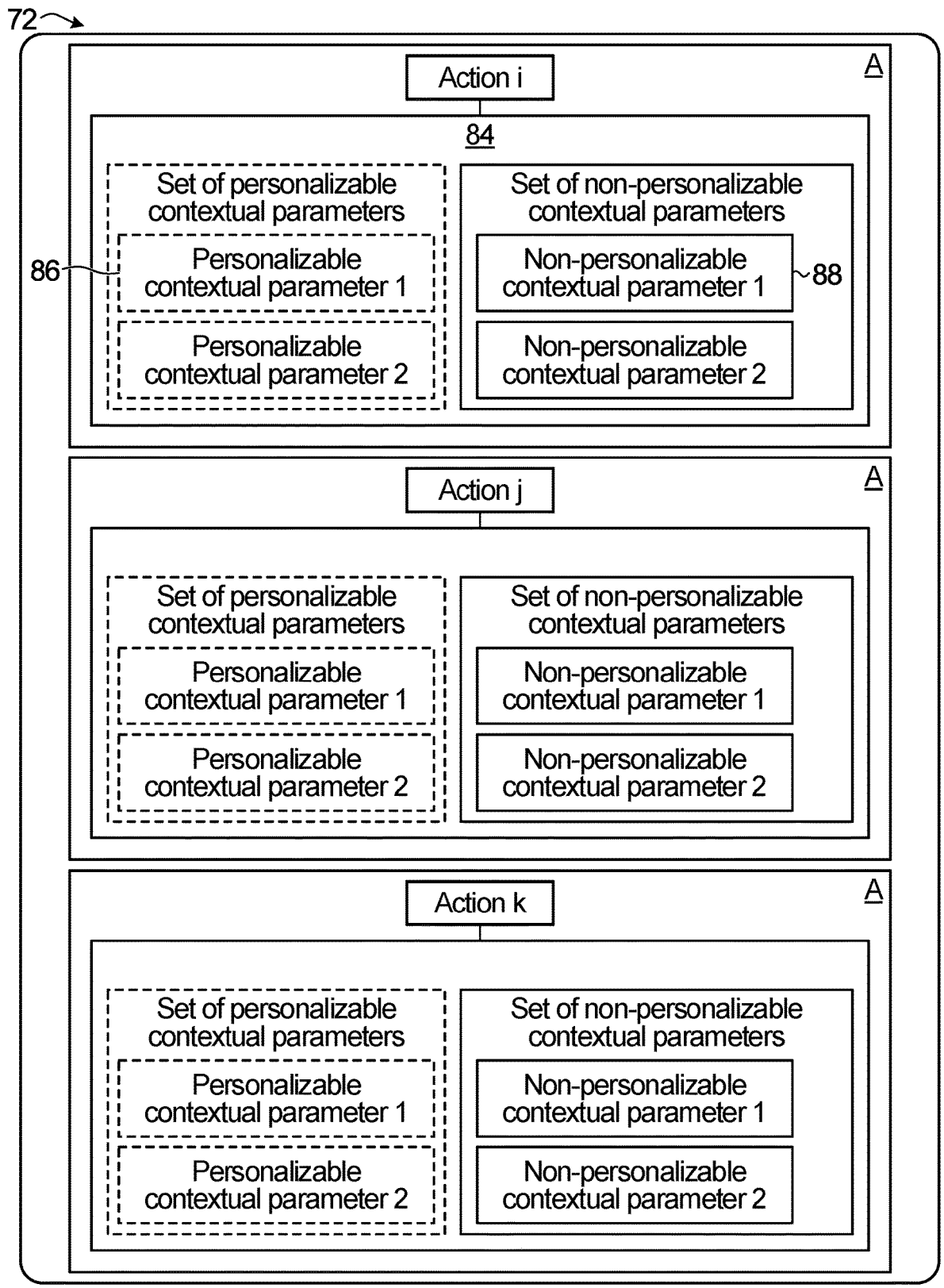
FIG. 5A conceptually illustrates sets of contextual parameters associated with performable gameplay actions, in accordance with a non-limiting embodiment.
Figure 5B:
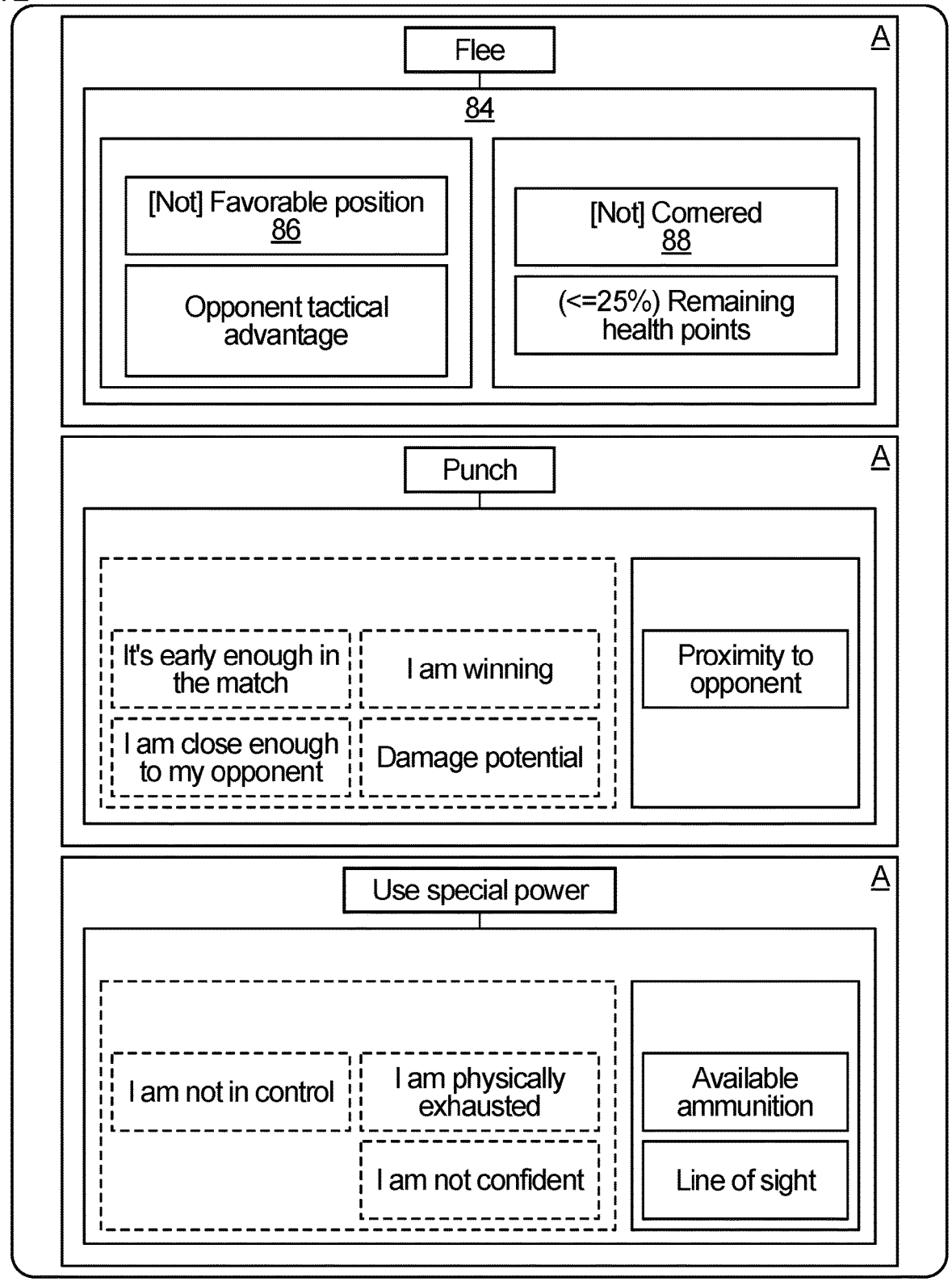
FIG. 5B is a non-limiting example of FIG. 5A in the context of a fighting video game, in accordance with a non-limiting embodiment.

FIG. 5A illustrates the association between each performable gameplay action A of the plurality of performable gameplay actions 72 and its associated set of contextual parameters 84. In accordance with the non-limiting example shown in FIG. 5B, the performable gameplay action flee is associated with a set of contextual parameters 84 comprising the following four contextual parameters: [not] cornered, (<=25%) remaining health points, [not] favorable position and opponent tactical advantage. It should be appreciated that there is no particular limit as to the number or nature of contextual parameters that may be part of the set of contextual parameters 84 associated with a particular performable gameplay action A.

The set of contextual parameters 84 associated with the performable gameplay action flee reflects game state considerations and/or prerequisites that the virtual fighter must 'evaluate' during a fighting session in order to assess if this performable gameplay action flee should be carried out in a given context of the fighting session, the given context being defined by the current game data 50. In other words, the set of contextual parameters 84 associated with the performable gameplay action flee reflects game state considerations and/or prerequisites that the virtual fighter must 'evaluate' during a fighting session in order to assess the utility of fleeing in a given context of the fighting session, the given context being defined by the current game data 50.

For example, the contextual parameter [not]cornered reflects a prerequisite that the virtual fighter not be cornered (e.g., by the opponent character and/or an object or objects in the gaming environment 8) in order to flee. Said differently, flee may be considered a useful gameplay action in a context of the fighting session only if the current game data 50 is reflective of the virtual fighter not being cornered in the gaming environment 8.

In yet another example, the contextual parameter (<=25%) remaining health points reflects a game state consideration wherein an amount of health of the virtual fighter should be evaluated to determine the utility of fleeing from the opponent character in a given context of the fighting session. In this case, it may be considered useful for the virtual fighter to flee from the opponent character if the virtual fighter's health points fall below a threshold amount, in this case, less than 25%. Conversely, it may be less useful for the virtual fighter to flee from the opponent character if the virtual fighter's health points are above this threshold amount. This threshold amount may be encoded by a game designer at the time of game design.

In yet another example, the contextual parameter opponent tactical advantage reflects a game state consideration wherein an opponent's tactical advantage should be evaluated to determine the utility of the virtual fighter fleeing from the opponent character in a given context of the fighting session. In this case, it may be considered useful for the virtual fighter to flee from the opponent character if the opponent character has a tactical advantage over the virtual fighter in a given context of the fighting session. Conversely, it may be less useful for the virtual fighter to flee from the opponent character if the opponent character does not have a tactical advantage over the virtual fighter in a given context of the fighting session.

In yet another example, the contextual parameter [not] favorable position reflects a game state consideration wherein the favorability of the position of the virtual fighter relative to the opponent character should be evaluated to determine the utility of the virtual fighter fleeing from the opponent character in a given context of the fighting session. The contextual parameter [not] favorable position may be conceptually understood as a tangible construct related to physical space (e.g., related to whether the virtual fighter in a spatial position that is favorable with respect to the opponent character's spatial position in the gaming environment 8). Additionally and/or alternatively, the contextual parameter [not] favorable position may be conceptually understood as an abstract construct such as a situation that confers advantage or preference to one of the virtual fighter or the opponent character, based on the particularities of a given context (e.g., factors such as the virtual fighter not being pinned down, not being slowed down, being in a position where he/she/they can deploy their weapon or punch, the virtual fighter having a lot of time remaining the game, etc.). In this case, if it is evaluated that the virtual fighter is in an unfavorable position relative to the opponent character, it may be useful for the virtual fighter to flee the opponent character. Conversely, if it is evaluated that the virtual fighter is in a favorable position relative to the opponent character, it may be less useful for the virtual fighter to flee from the opponent character.

The set of contextual parameters 84 associated with the performable gameplay action flee reflect game state considerations that the virtual fighter must evaluate during a fighting session in order to assess the utility of fleeing in a given context of the fighting session, as defined by the current game data 50.

The at least one processor 11 of the video game apparatus 10 is configured to generate a contextual parameter aggregate 78 for each contextual parameter in the set of contextual parameters 84 associated with a particular performable gameplay action A. The contextual parameter aggregate 78 may be configured as any numerical value, such as an integer, a fraction or a percentage. The preference score 76 for a particular performable gameplay action A is then computed based on a combination of the contextual parameter aggregate 78 of each contextual parameter in the set of contextual parameters 84 associated with the particular performable gameplay action A.

In some embodiments, the combination which generates the preference score 76 may be a sum of the contextual parameter aggregate 78 for each contextual parameter in the set of contextual parameters 84 associated with a particular performable gameplay action A. In other embodiments, the combination which generates the preference score 76 may be an average of the contextual parameter aggregates 78 for the set of contextual parameters 84 associated with a particular performable gameplay action A. In other embodiments, the combination which generates the preference score 76 may be a linear combination of the contextual parameter aggregate 78 for each contextual parameter in the set of contextual parameters 84 associated with a particular performable gameplay action A. In such cases, coefficients utilized in the linear combination in association with each of the contextual parameters in the set of contextual parameters 84 may be indicative of relative importance of the contextual parameters in the set of contextual parameters 84 (e.g., the larger the coefficient, the more important the respective contextual parameter.)

Figure 6B:
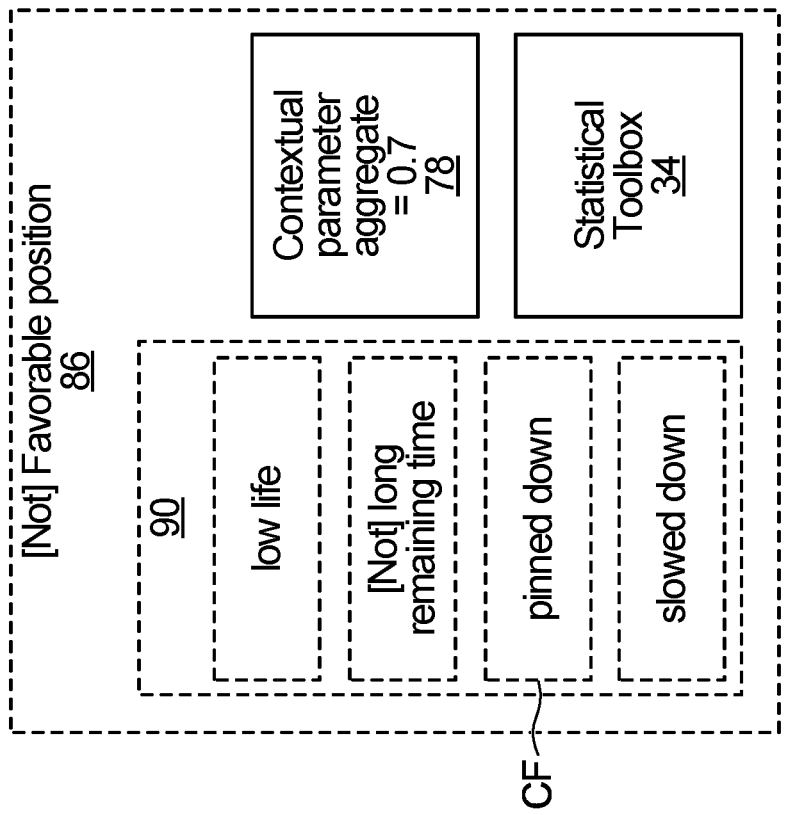
FIG. 6B is a non-limiting example of FIG. 6A in the non-limiting context of a fighting video game.
Figure 6A:
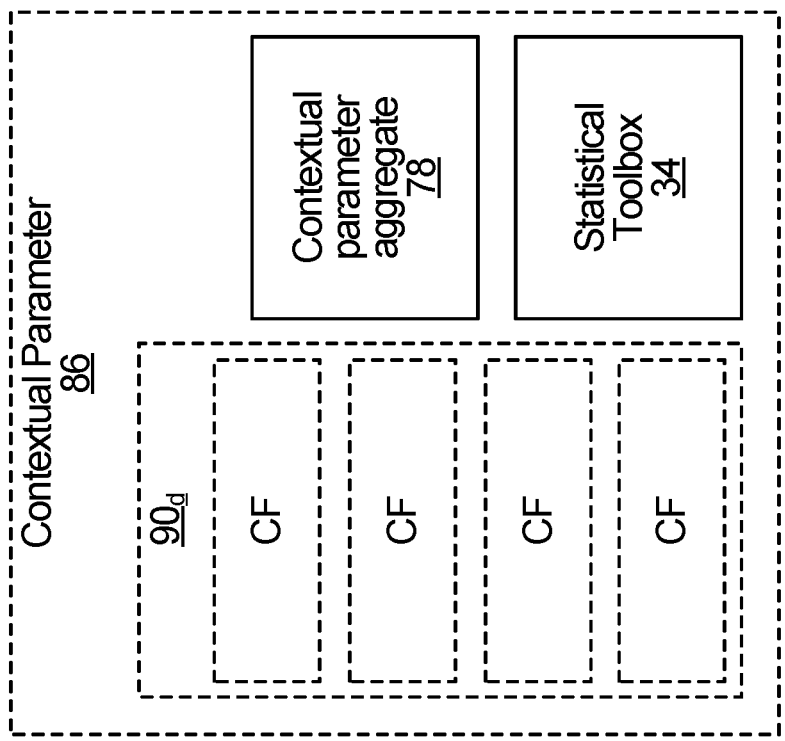
FIG. 6A conceptually illustrates a set of contextual factors associated with a contextual parameter of FIG. 5A, in accordance with a non-limiting embodiment.

As shown in FIG. 6B, a given contextual parameter in the set of contextual parameters 84 may be associated with its own set of "contextual factors" 90. Moreover, the current game data 50 comprises a plurality of game state variables 92 and, as shown in FIG. 7A, each contextual factor CF in the set of contextual factors 90 is associated with one or more of these game state variables 92. The set of contextual factors 90 and the association with the one or more of the game state variables 92 are stored in the memory 12 as part of the behavioral model 100. The set of contextual factors 90 and the one or more of the game state variables 92 contribute to the contextual parameter aggregate 78, as will be further discussed below.

In this example, as shown in FIG. 6B, the contextual parameter [not] favorable position is associated with the following four contextual factors: low life, [not] long remaining time, pinned down, slowed down. It is also understood that there is no particular limit as to how many contextual factors CF may be part of a set of contextual factors 90. The above-listed contextual factors CF may be associated with the contextual parameter [not] favorable position as part of a default set of contextual factors 90d determined by a game designer at the time of game design and/or may be associated with the contextual parameter [not] favorable position by the player 1 during a coaching session, as will be further described later on.

As indicated above, the contextual parameter [not] favorable position may be conceptually understood as a tangible construct related to physical space and/or an abstract construct such as a situation that confers advantage or preference to one of the virtual fighter or the opponent character, based on the particularities of a given context. The contextual factors CF in the set of contextual factors 90 associated with the contextual parameter [not] favorable position by the player 1 during a coaching session characterize the player's interpretation of this contextual parameter.

In this case, during the one or more coaching sessions preceding the fighting session, the player 1 will have characterized the virtual fighter being in a favorable position in a fighting session as depending on (i) a low amount of life, (ii) not a long remaining time in the fighting session, (iii) the virtual fighter not being pinned down and (iv) the virtual fighter not being slowed down. Accordingly, the contextual factors CF in the set of contextual factors 90 associated with the contextual parameter [not] favorable position are: low life, [not] long remaining time, pinned down, slowed down.

As previously mentioned, each contextual factor CF in the set of contextual factors 90 is associated with one or more of the game state variables 92. As shown in the example of FIG. 7C, the contextual factor low life may be a game state variable 92 having a value which characterizes the remaining life of the virtual fighter (e.g., as an integer value, a fractional value or a percentage value representing time or an amount of health points, in accordance with a few non-limiting examples). As shown in the example of FIG. 7B, the contextual factor pinned down may be defined by two game state variables 92. The first game state variable 92 may have a value which characterizes the relative position between the virtual fighter and the opponent character (e.g., a measure of distance between the virtual fighter and the opponent character in the gaming environment 8, in units of distance such a meters (m) or feet (ft), pixels, voxels, etc.). The second game state variable 92 may have a value which characterizes an amount of pressure exerted by the opponent character on the virtual fighter. Values of the one or more game state variables 92 associated with each of the contextual factors CF in the set of contextual factors 90 are tracked by the game code 18.

Each of the contextual factors CF in the set of contextual factors 90 associated with a particular contextual parameter (in turn associated with a particular performable gameplay action A) contributes to the contextual parameter aggregate 78 by way of a contextual factor value 94 generated by the at least one processor 11 of the video game apparatus 10. The contextual factor value 94 for a particular contextual factor CF in the set of contextual factors 90 is generated based on the one or more of the game state variables 92 associated with the particular contextual factor CF and their values as based on the current game data 50.

For example, the values of the one or more of the game state variables 92 associated with the contextual factor pinned down may be normalized and combined to yield the contextual factor value 94 for the contextual factor pinned down according to an algorithm encoded by the game designer at the time of game design. The contextual factor value 94 for the contextual factor pinned down may be representative of the extent to which the virtual fighter is pinned down by the opponent character in the fighting session based on the current game data 50. The contextual factor value 94 may be configured as an integer, fraction or percentage, for example.

Each contextual factor CF in the set of contextual factors 90 may be assigned a weight 96 by the game code 18, the weight 96 indicative of the contribution of a particular contextual factor value 94 to the contextual parameter aggregate 78. In other words, the weight 96 is indicative of the sensitivity of a contextual parameter to a particular contextual factor CF. The weight 96 may be computed according to an algorithm encoded by the game designer at the time of game design.

Figure 8:
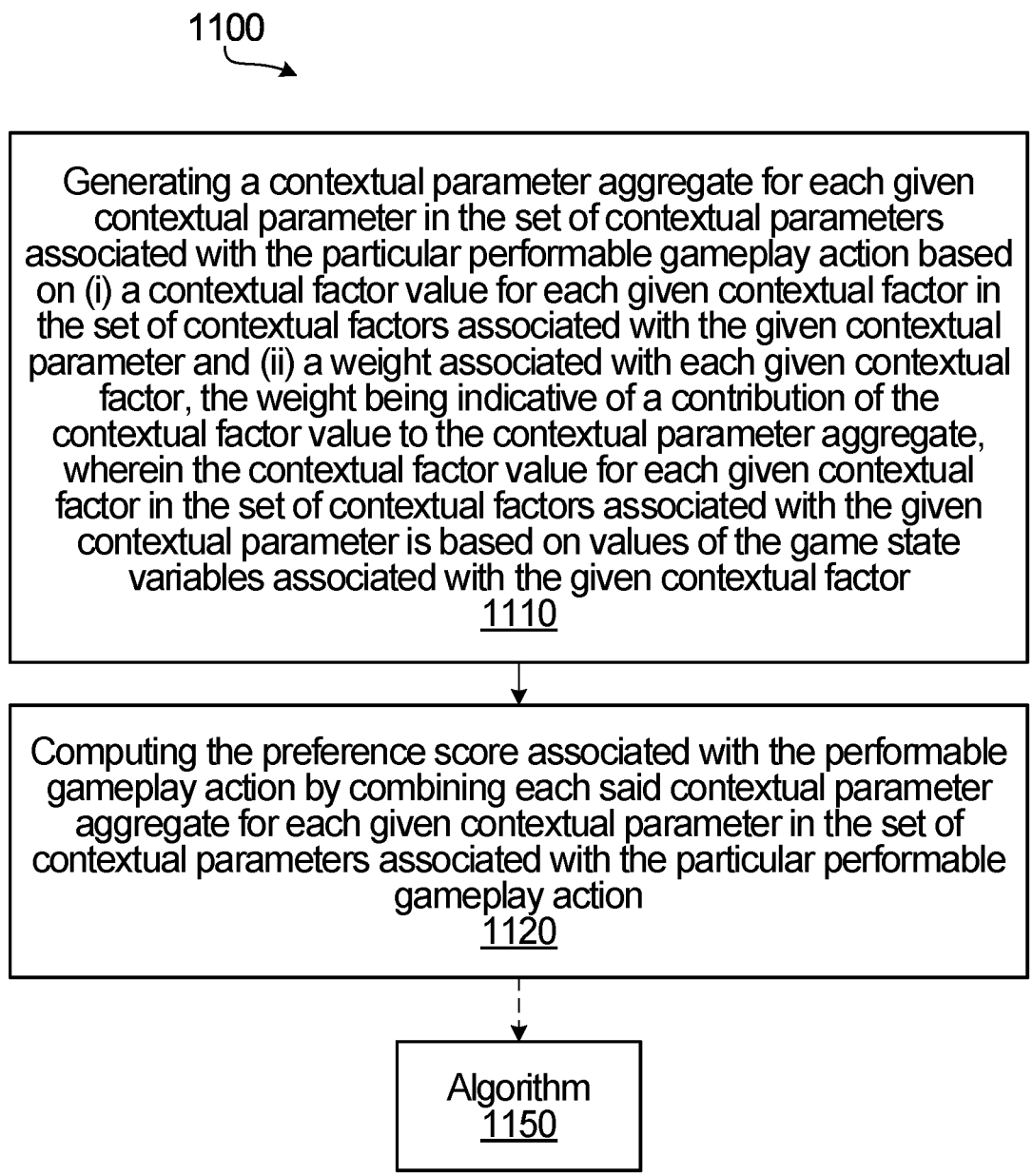
FIG. 8 is a flowchart illustrating steps of a preference score computing algorithm, in accordance with a non-limiting embodiment of the present disclosure.

Reference is now made to the flowchart in FIG. 8 showing steps of an algorithm 1100 executed by the at least one processor 11 according to which a preference score 76 associated with a particular performable gameplay action A is computed. At step 1110, the at least one processor 11 generates the contextual parameter aggregate 78 for each given contextual parameter in the set of contextual parameters 84 associated with the particular performable gameplay action A based on (i) the contextual factor value 94 for each given contextual factor CF in the set of contextual factors 90 associated with the given contextual parameter and (ii) the weight 96 associated with each given contextual factor CF, the weight 96 being indicative of the contribution of the contextual factor value 94 to the contextual parameter aggregate 78. The contextual factor value 94 for each given contextual factor CF in the set of contextual factors 90 associated with the given contextual parameter is based on values of the game state variables 92 associated with the given contextual factor CF.

At step 1120, the at least one processor 11 of the video game apparatus 10 computes the preference score 76 associated with the performable gameplay action A by combining each contextual parameter aggregate 78 for each given contextual parameter in the set of contextual parameters 84 associated with the particular performable gameplay action A.

During a fighting session, the algorithm 1100 according to which the preference score 76 is computed for each performable gameplay action A of the plurality of performable gameplay actions 72 may be executed and followed by the execution of the previously described algorithm 1150 according to which the performable gameplay action A having the highest preference score 76 is determined/identified such that it may be carried out by the virtual fighter.

IV. Adapting the Behavioral Model 100

In some cases, the contextual factors CF in a given set of contextual factors 90 associated with a given contextual parameter are predetermined by a game designer at the time of game design and a composition of the given set of contextual factors 90 cannot be modified by the player 1. In this case, this given contextual parameter is a non-personalizable contextual parameter 88.

In other cases, the composition of the set of contextual factors 90 associated with a given contextual parameter may be modified by the player 1 during the one or more coaching sessions that precede the fighting session. In this case, this given contextual parameter is a "personalizable" contextual parameter 86. A personalizable contextual parameter 86 is a contextual parameter which is reserved at the time of game design by a game designer and is known to and used by the player 1 during a coaching session.

Specifically, the coaching session allows the player 1 to associate (i.e., "tie") one or more contextual factors CF to a personalizable contextual parameter 86 by providing "recommendations". At the time of game design, each personalizable contextual parameter 86 may be associated with a default set of contextual factors 90a determined by the game designer. During the coaching session, when the player 1 provides recommendations, the default set of contextual factors 90*a* associated with a particular personalizable contextual parameter 86 is updated with the contextual factors CF extracted from the player's recommendations.

As described above, a weight 96 may be attributed to each given contextual factor CF in the set of contextual factors 90 associated with a given contextual parameter. This weight 96 is computed using an algorithm designed to set values according to the player's recommendations. The algorithm evaluates, for example, how often a given contextual factor CF is associated with a given personalizable contextual parameter 86, or how important a given contextual factor CF is with respect to a given personalizable contextual parameter 86. This may differ from one player's recommendations to those of another. As previously noted, the weight 96 is indicative of the contribution of a particular contextual factor value 94 to the contextual parameter aggregate 78. In other words, the weight 96 is indicative of the sensitivity of a contextual parameter to a particular contextual factor CF.

Tying one or more contextual factors CF to a personalizable contextual parameter 86 based on recommendations obtained from the player 1 during the coaching session adapts the behavioral model 100 for the plurality of performable gameplay actions 72 and thus defines the overall behavior of the virtual fighter. During the fighting session, the virtual fighter carries out the gameplay actions A in accordance with the behavioral model 100.

Figure 2B:
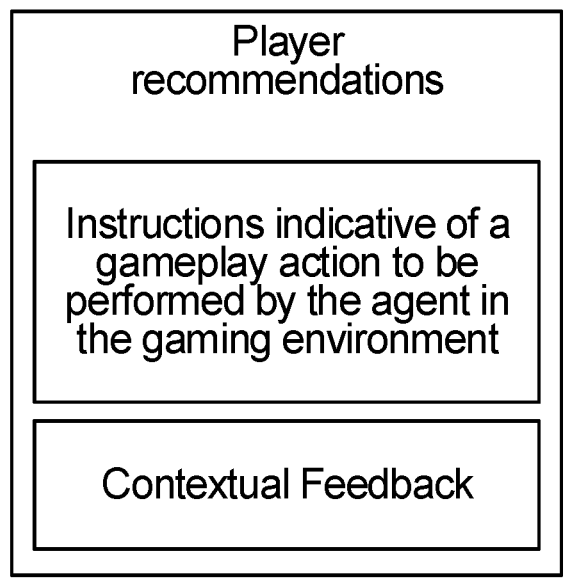
FIG. 2B is a block diagram that illustrates player recommendations provided by a player during the coaching session of the video game, in accordance with a non-limiting embodiment.

Accordingly, the coaching session may be represented as the block diagram in FIG. 2A which illustrates providing player recommendations and adapting a behavioral model 100 for the agent based on those recommendations. As illustrated in the block diagram of FIG. 2B, the player recommendations include (i) instructions indicative of a gameplay action A to be performed by the agent in the gaming environment 8 and (ii) contextual feedback related to a personalizable contextual parameter 86 to be personalized by the player 1 by tying one or more contextual factors CF to such personalizable contextual parameter 86. Contextual feedback is defined as player input related to (i) a contextual parameter that is personalizable or (ii) a contextual factor CF in the set of contextual factors 90 associated with a contextual parameter that is personalizable.

Thus, generally speaking, implementing a coaching session of the video game includes receiving instructions from the player 1 of the video game, the instructions indicative of a gameplay action A to be performed by the agent in the gaming environment 8. The coaching session further includes receiving contextual feedback from the player regarding said gameplay action. The coaching session also includes adapting the behavioral model 100 based on the instructions and the contextual feedback. The end result of adapting the behavioral model 100 is that the virtual fighter is able to infer the player's preferred course of action when presented with new situations in a fighting session (subsequent to the coaching session).

Figure 10:
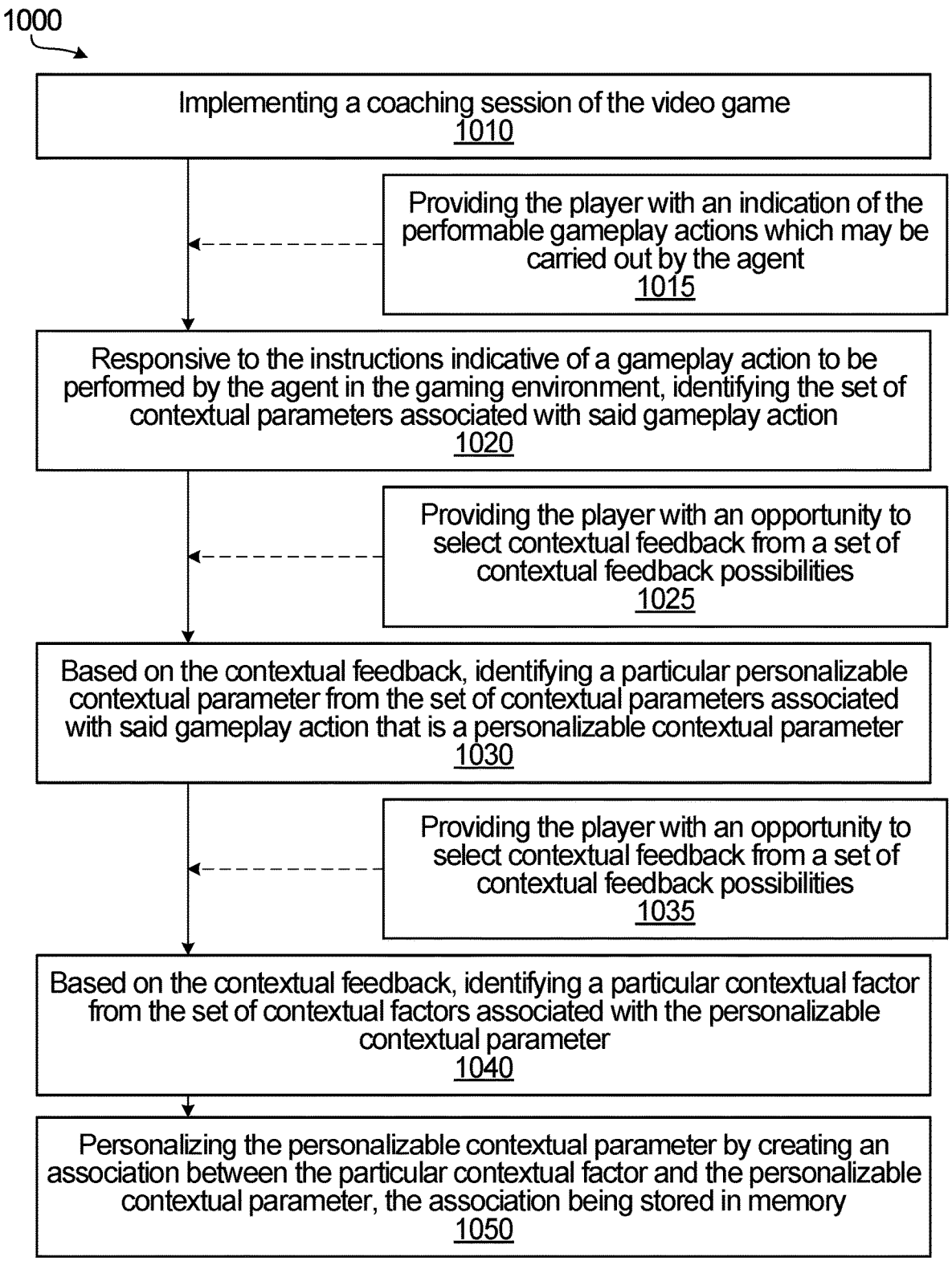
FIG. 10 is a flowchart illustrating steps of a behavioral model adaptation algorithm, in accordance with a non-limiting embodiment of the present disclosure.

Reference is now made to the flowchart in FIG. 10 showing steps of a behavioral model adaptation algorithm 1000 executed by the at least one processor 11 according to which the behavioral model 100 is adapted during a coaching session.

At step 1010, a coaching session of the video game is implemented. A coaching session may present the player 1 with simplified gaming situations as the player 1 learns to adapt the behavioral model 100. The gaming situations may increase in complexity as the player 1 grows more familiar with the process of adapting the behavioral model 100 such that a structured learning environment is provided for the player 1. For example, the virtual fighter initially faces only one opponent character. As the player 1 grows familiar with the process of adapting the behavioral model 100 associated with the virtual fighter, subsequent coaching sessions may include two or more opponent characters or increasingly challenging opponent characters (e.g., opponent characters of increasing strength, agility etc.).

At step 1020, responsive to instructions (from the player 1) indicative of a performable gameplay action A to be performed by the virtual fighter in the gaming environment 8, the set of contextual parameters 84 associated with that performable gameplay action A is identified. In this step, the set of contextual parameters 84 is determined by the at least one processor 11 of the video game apparatus 10 which accesses the memory 12, and retrieves the contextual parameters 84 stored as part of the behavioral model 100 in association with the performable gameplay action A.

In some embodiments, the coaching session comprises a step 1015 of providing the player 1 with an indication of multiple performable gameplay actions A that could potentially be carried out by the virtual fighter, prior to receiving the instructions indicative of the performable gameplay action A to be performed by the virtual fighter in the gaming environment 8. For example, at the time of game design, a game designer may encode a list or menu of performable gameplay actions A to be stored in the memory 12 and this list or menu may be provided to the player 1 during the coaching session (e.g., via outputs to the internal display device 15 or the external display device 16 and/or an auditory device (e.g., a speaker) via the input/output module 14) prior to receiving the instructions indicative of a gameplay action A to be performed by the virtual fighter in the gaming environment 8. The player 1 may then select the performable gameplay action A from the list or menu of performable gameplay actions A. This selection may then be provided by the player 1 as a recommendation, specifically as instructions indicative of a gameplay action A to be performed by the virtual fighter in the gaming environment 8.

At step 1030, based on contextual feedback (from the player 1), a particular contextual parameter from the set of contextual parameters 84 associated with the gameplay action A is identified, such particular contextual parameter being a personalizable contextual parameter 86.

In some embodiments, the coaching session comprises a step 1025 of providing the player 1 with an opportunity to select the contextual feedback from a set of contextual feedback possibilities. For example, the coaching session may comprise providing the player 1 with an indication of the personalizable contextual parameters 86 which are associated with a particular performable gameplay action A. For example, at the time of game design, a game designer may 'reserve' personalizable contextual parameters 86 associated with a particular performable gameplay action A and a list or menu of these personalizable contextual parameters 86 may be provided to the player 1 during the coaching session (e.g., via outputs to the internal display device 15 or the external display device 16 and/or an auditory device (e.g., a speaker) via the input/output module 14). The player 1 may then select the personalizable contextual parameter 86 from this list or menu of personalizable contextual parameters 86. This selection may then be provided by the player 1 as a recommendation, specifically as contextual feedback related to the particular performable gameplay action A.

At step 1040, also based on additional contextual feedback (from the player 1), a particular contextual factor CF to be associated with the particular personalizable contextual parameter 86 is identified.

In some embodiments, the coaching session comprises a step 1035 of providing the player 1 with an opportunity to select the additional contextual feedback from a set of additional contextual feedback possibilities. For example, the coaching session may comprise providing the player 1 with an indication of the contextual factors CF which can be associated (i.e., tied) to the particular personalizable contextual parameter 86. For example, at the time of game design, a game designer may encode a list or menu of contextual factors CF to be stored in the memory 12. This list or menu of contextual factors CF may be provided to the player 1 during the coaching session (e.g., via outputs to the internal display device 15 or the external display device 16 and/or an auditory device (e.g., a speaker) via the input/output module 14). The player 1 may then select the particular contextual factor CF from this list or menu of contextual factors CF. This selection may then be provided by the player 1 as a recommendation, specifically as additional contextual feedback related to the particular personalizable contextual parameter 86.

At step 1050, based on further contextual feedback, the particular personalizable contextual parameter 86 is personalized by creating an association between the particular contextual factor CF and the particular personalizable contextual parameter 86, the association being stored in the memory 12.

In one example, personalizing the particular personalizable contextual parameter 86 comprises tying the particular contextual factor CF to the personalizable contextual parameter 86 in the memory 12. Additionally or alternatively, personalizing the particular personalizable contextual parameter 86 may comprise recording an instance of the player 1 tying the particular contextual factor CF to the particular personalizable contextual parameter 86. For example, a variable or an array may be stored in the memory 12 to track instances of the player 1 tying the particular contextual factor CF to the particular personalizable contextual parameter 86 across one or more coaching sessions. Additionally or alternatively, creating an association between the particular contextual factor CF and the particular personalizable contextual parameter 86 may comprise modifying the weight 96 associated with the particular contextual factor CF. For example, the weight 96 of the contextual factor CF may be set.

Figure 11:
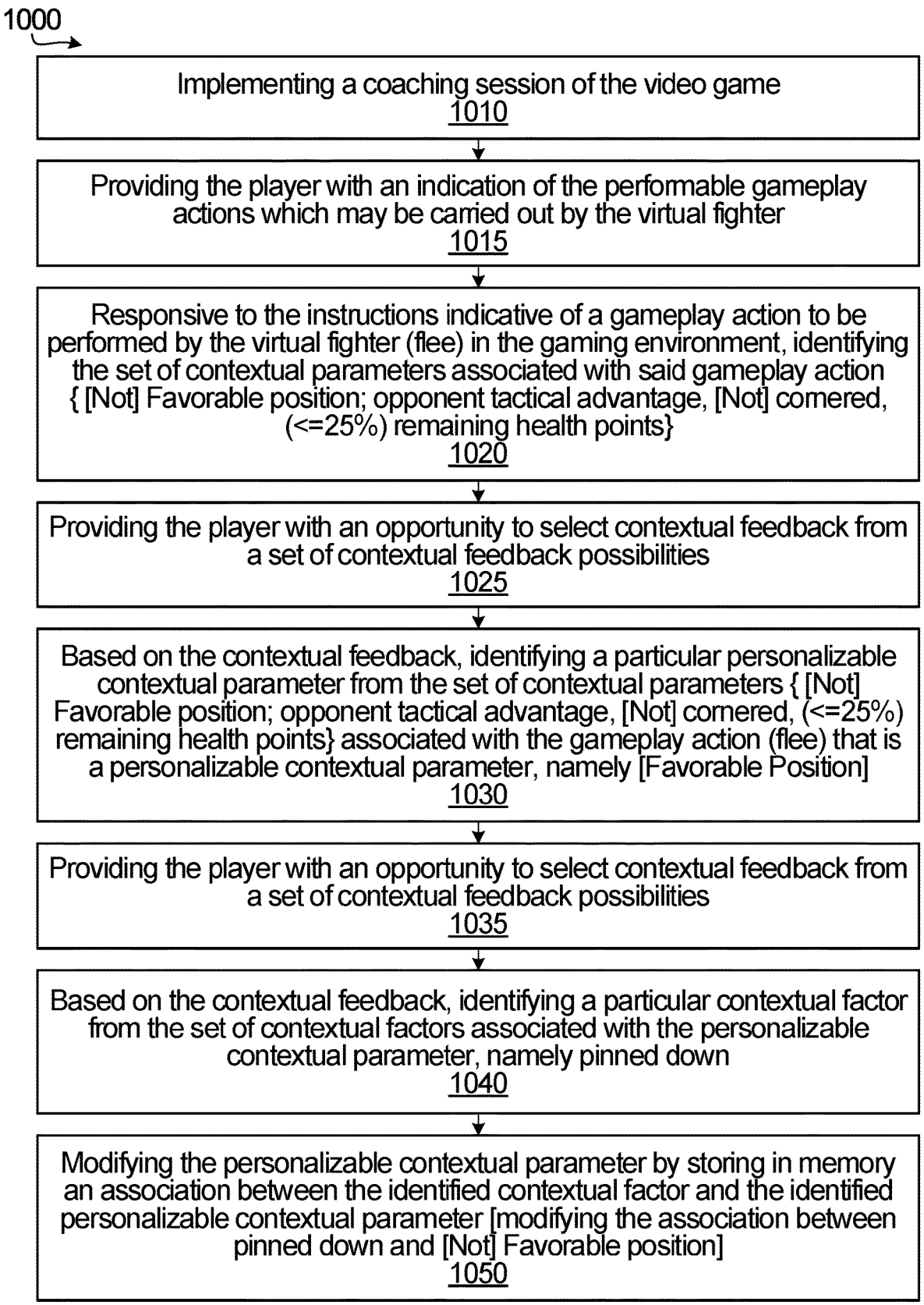
FIG. 11 is a non-limiting example of FIG. 10 in the non-limiting context of a fighting video game.

Reference is now also made to the flowchart in FIG. 11, showing the steps in a specific non-limiting example embodiment of the behavioral model adaptation algorithm 1000 executed by the at least one processor 11 of the video game apparatus 10 according to which the behavioral model 100 is adapted during a coaching session, as applied to the performable gameplay action flee, the personalizable contextual parameter [not] favorable position and the contextual factor pinned down.

At step 1010, a coaching session of the video game is implemented comprising the virtual fighter and the opponent character.

In this example of implementation, the coaching session comprises a step 1015 of providing the player 1 with an indication of the performable gameplay actions A which may be carried out by the virtual fighter, prior to receiving the instructions indicative of a performable gameplay action A to be performed by the virtual fighter in the gaming environment 8. In this case, a list of performable gameplay actions is provided to the player 1 during the coaching session (e.g., via outputs to the internal display device 15 or the external display device 16 and/or an auditory device (e.g., a speaker) via the input/output module 14). In this case, the player 1 selects the performable gameplay action flee from the list of performable gameplay actions A. This selection may then be provided by the player 1 as a recommendation, specifically as instructions indicative of a gameplay action A to be performed by the virtual fighter in the gaming environment 8, namely the gameplay action flee.

At step 1020, responsive to instructions (from the player 1) indicative that the gameplay action flee is to be performed by the virtual fighter in the gaming environment 8, the set of contextual parameters 84 associated with that gameplay action flee is identified. In this step, the set of contextual parameters 84 is identified by the at least one processor 11 of the video game apparatus 10 which accesses the memory 12, and retrieves the contextual parameters 84 stored as part of the behavioral model 100 in association with the performable gameplay action flee.

In this example, the set of contextual parameters 84 associated with the performable gameplay action flee includes the personalizable contextual parameters 86: [not] favorable position and opponent tactical advantage. In this embodiment, the coaching session comprises a step 1025 of providing the player 1 with an opportunity to select the contextual feedback from a set of contextual feedback possibilities. Thus, in this example of implementation, the coaching session comprises providing the player 1 with an indication of the personalizable contextual parameters 86 which are associated with the performable gameplay action flee. Accordingly, the list of personalizable contextual parameters 86 associated with the performable gameplay action flee is provided to the player 1 during the coaching session (e.g., via outputs to the internal display device 15 or the external display device 16 and/or an auditory device (e.g., a speaker) via the input/output module 14). In this case, the player 1 selects the personalizable contextual parameter [not] favorable position from the list of personalizable contextual parameters 86. This selection is provided by the player 1 as a recommendation, specifically as contextual feedback related to the performable gameplay action flee.

At step 1030, based on the contextual feedback from the player 1, a particular contextual parameter 86 from the set of contextual parameters 84 associated with the gameplay action flee is identified, the particular contextual parameter being a personalizable contextual parameter 86, namely the personalizable contextual parameter [not] favorable position.

In this example, the contextual factors CF which may be associated with the personalizable contextual parameter [not] favorable position includes the following contextual factors: [can't] punch, close to ledge, low life, [not] long remaining time, pinned down, slowed down. In this example of implementation, the coaching session comprises a step 1035 providing the player 1 with an opportunity to select additional contextual feedback from a set of additional contextual feedback possibilities by providing the player 1 with an indication of the contextual factors CF which can be associated (i.e., tied) to the particular personalizable contextual parameter [not] favorable position as a list of contextual factors CF. In this case, the coaching session comprises providing the player 1 with the list of contextual factors CF which may be associated with the performable gameplay action flee (e.g., via outputs to the internal display device 15 or the external display device 16 and/or an auditory device (e.g., a speaker) via the input/output module 14). In this case, the player 1 selects the contextual factor pinned down from the list of contextual factors CF. This selection is provided by the player 1 as a recommendation, specifically as additional contextual feedback related to the personalizable contextual parameter [not] favorable position.

Thus at step 1040, based on the contextual feedback from the player 1, a particular contextual factor CF to be associated with the particular personalizable contextual parameter 86 is identified, namely the contextual factor pinned down to be associated with the personalizable contextual parameter [not] favorable position.

At step 1050, based on further contextual feedback, the particular personalizable contextual parameter [not] favorable position is personalized by creating an association between the particular contextual factor pinned down and the particular personalizable contextual parameter [not] favorable position, the association being stored in the memory 12.

In this example, personalizing the particular personalizable contextual parameter [not] favorable position comprises tying the contextual factor pinned down to the personalizable contextual parameter [not] favorable position in the memory 12.

It should be appreciated that the coaching session allows different players to associate a particular personalizable contextual parameter 86 to different sets of contextual factors 90, according to their own coaching style. This means that contextual parameter aggregate 78 associated with the same particular contextual parameter 86 during a subsequent fighting session may lead to one preference score 76 in the case of a virtual fighter coached by the player 1, and a different preference score 76 in the case of a virtual fighter coached by player 2.

For example, both player 1 and player 2 may indicate that the performable gameplay action A to be performed by the virtual fighter is flee and both player 1 and player 2 may indicate that the virtual fighter must flee because he/she is (or they are) not in a favorable position. However, player 1 may express that the virtual fighter is not in a favorable position because the virtual fighter is pinned down (i.e., contextual factor=pinned down) whereas player 2 may express that the virtual fighter is not in a favorable position because the virtual fighter can't punch (i.e., contextual factor=[can't] punch).

The variance in player-to-player reasoning for the same personalizable contextual parameter 86 ultimately leads to the contextual parameter aggregate 78 associated with that personalizable contextual parameter 86 being evaluated differently for the virtual fighter, depending on which player (i.e., player 1 or player 2) was the coach. Ultimately, this leads to differences in the way that the preference score 76 for performable gameplay action A whose behavioral model 100 incorporates such a personalizable contextual parameter 86 is computed for the two virtual fighters. This, in turn, leads to the possibility of a different performable gameplay action A being selected for the two virtual fighters for the same underlying fighting situation, which is manifested as personalization at the level of the virtual fighter's behavior.

V. Detecting Inconsistences in Player Recommendations

Aspects of the present disclosure relate to adapting (i.e., training) the behavioral model 100 so as to 'control the behavior' of an agent during a gaming session based on data obtained as a result of interactions with the player 1 during a coaching session. It should be noted that the player 1 need not be familiar with the behavioral model 100 or its operation (or even its existence) in order to play the video game. Indeed, the player 1 may make "mistakes" when providing recommendations. Indeed, whenever the player associates one or more contextual factors CF to a particular personalizable parameter 86, this involves the player's personal assessment of the situation presented in a given situation. As such, this assessment may be only partly correct, or even incorrect.

For example, assume that during the coaching session, the player 1 indicates that the virtual fighter is not in a favorable position because there is not a lot of time remaining in the coaching session (i.e., the contextual factor [not] long remaining time). Now, it is possible that there actually is a significant amount of time remaining in the coaching session (e.g., more than T seconds), as this is a game state variable 92 that is tracked by the game code 18 as part of the current game data 50. The apparent inconsistency between the required value of a game state variable 92 associated with a contextual factor CF (e.g., [not] long remaining time) when given as a rationale for the personalizable contextual parameter [not] favorable position and the objective measurement of this contextual factor CF in the game (e.g., time remaining>T) can be tracked using a statistical toolbox 34, as shown in FIG. 13B. The statistical toolbox 34 may be stored as a table in the memory 12 as part of the behavioral model 100.

In yet another example, assume that during a given coaching session, the player 1 indicates that the virtual fighter is not in a favorable position (i.e., the personalizable contextual parameter [not] favorable position) because there is not a lot of time remaining in the coaching session (i.e., the contextual factor [not] long remaining time). Now, it is possible that in a subsequent coaching session, the player 1 contradicts themselves and indicates that the virtual fighter is in fact in a favorable position (i.e., the personalizable contextual parameter favorable position) because there is not a lot of time remaining in the coaching session (i.e., the contextual factor [not] long remaining time). The apparent inconsistency between the contextual parameters ([not] favorable position and favorable position) with respect to the same contextual factor CF (e.g., [not] long remaining time) can be tracked using the statistical toolbox 34, as shown in FIG. 13B. As can be appreciated from FIG. 13B, the statistical toolbox 34 may track information concerning more than one personalizable contextual parameter 86 (in this case, [not] favorable position and favorable position).

In particular, the game code 18 continuously assesses all the contextual factors CF in the set of contextual factors 90 tied to a particular personalizable parameter 86 and cross-correlates them in order to determine if any contextual factors CF in the set of contextual factors 90 appear to be redundant, contradictory or unimportant. Accordingly, a statistical analysis of past player recommendations (e.g., an analysis of a given set of contextual factors 90) may be conducted such that the game code 18 may be configured to generate one or more markers of inconsistencies 46 in a set of contextual factors 90 (i.e., markers of independence, conflict, importance in accordance with a few non-limiting examples). The statistical analysis may be performed at the end of every coaching session, any time a change is made to a set of contextual factors 90 or any other suitable time during the coaching session.

These markers of inconsistencies 46 may be represented as a a numerical value (e.g., ranging between 0 and 1) which characterizes the degree to which a contextual factor CF is independent from another contextual factor CF, the degree to which a contextual factor CF conflicts with and therefore contradicts another contextual factor CF, the degree of consistency of the player's recommendations with respect to associating a contextual factor CF with multiple personalizable contextual parameters 86 or the degree to which a contextual factor CF is important in evaluating a personalizable contextual parameter, in accordance with a few non-limiting examples. Once generated, these markers of inconsistencies 46 may be presented to the player 1 as summarized in a statistical toolbox 34 associated with a particular personalizable contextual parameter 86, as will be discussed below.

For example, results of a statistical analysis of past player recommendations from the player 1, may suggest that the contextual factors pinned down and slowed down associated with the personalizable contextual parameter [not] favorable position indicates are not statistically independent and therefore may be considered redundant. At the time of game design, the game designer may encode any suitable algorithm for determining the statistical independence of contextual factors CF in a set of contextual factors 90.

An output of this algorithm is the marker of independence which reflects the independence of a contextual factor CF with respect to another, in this case the independence of the contextual factors pinned down and slowed down. For example, in this case, the marker of independence having a value below a threshold value set by a game designer at the time of game design signifies a lack of independence between a pair of contextual factors CF. In this example, the marker of independence for both contextual factors pinned down and slowed down is considered below the threshold value and accordingly, these contextual factors CF may be considered as lacking independence (i.e., they are redundant). This marker of independence is included in the statistical toolbox 34 as shown in FIGS. 13A and 13B.

In yet another example, results of a statistical analysis of past player recommendations from the player 1, may suggest that the contextual factor [not] long remaining time associated with the personalizable contextual parameter [not] favorable position is not statistically important when considering whether the virtual fighter is in an unfavorable position in a fighting and/or coaching session. At the time of game design, the game designer may encode any suitable algorithm for determining the statistical importance of contextual factors CF in a set of contextual factors 90.

An output of this algorithm is the marker of importance which reflects the importance of the contextual factor [not] long remaining time when evaluating the personalizable contextual parameter [not] favorable position. For example, in this case, the marker of importance having a value below a threshold value set by a game designer at the time of game design signifies a lack of importance of a contextual factor CF. In this case, the marker of independence for the contextual factor [not] long remaining time is considered below the threshold value and accordingly, this contextual factor CF may be considered unimportant. This marker of importance is included in the statistical toolbox 34 as shown in in FIGS. 13A and 13B.

In yet another example, results of a statistical analysis of past player recommendations from the player 1 may suggest that the contextual factors long remaining time and low life associated with the personalizable contextual parameter favorable position conflict and therefore may be considered contradictory.

In this example, the statistical analysis may further rely upon the one or more game state variables 92 associated with the contextual factors long remaining time and low life to assess a conflict between these contextual factors CF. In this case, the game state variable 92 that may be relied upon are the game state variables 92 which tracks an amount of time remaining in a session, the game state variable 92 which tracks the number of health points or the number of health points with respect to a threshold amount of health points below which the virtual fighter is characterized as having low remaining life.

At the time of game design, the game designer may encode any suitable algorithm for determining conflicts between contextual factors CF in a set of contextual factors 90. This algorithm may rely upon the values associated with the game state variables 92 described above. An output of this algorithm is the marker of conflict which reflects the level to which the contextual factor long remaining time conflicts with the contextual factor low life. For example, in this case, a marker of conflict having a value below above a particular threshold value set by a game designer at the time of game design signifies a conflict between a pair of contextual factors CF. In this case, the marker of conflict for each of the contextual factors long remaining time and low life is considered above the threshold value and accordingly, the contextual factors long remaining time and low life may be considered as conflicting. This marker of conflict is included in the statistical toolbox 34 as shown in in FIGS. 13A and 13B.

A marker of conflict may also be generated in the case of the previously discussed example wherein the player 1 indicates that the virtual fighter is not in a favorable position because there is not a lot of time remaining in the coaching session (i.e., the contextual factor [not] long remaining time) and yet there actually is a significant amount of time remaining in the coaching session (e.g., more than T seconds, T seconds being a threshold value encoded by the game designer at the time of game design for representing long remaining time).

A marker of conflict may also be generated in the case of another previously discussed example wherein the player 1 indicates that the virtual fighter is in a favorable position (i.e., the personalizable contextual parameter favorable position) because there is not a lot of time remaining (i.e., the contextual factor [not] long remaining time) and yet the player 1 previously indicated the virtual fighter was not in a favorable position (i.e., the personalizable contextual parameter [not] favorable position) because there was not a lot of time remaining (i.e., the contextual factor [not] long remaining time).

During a coaching session, the player 1 may be made aware of these inconsistencies by being provided the statistical toolbox 34. The behavioral model 100 may be further adapted by the player 1 in order to address these inconsistencies. For example, the player 1 may change the composition of the set of contextual factors 90 associated with a particular personalizable parameter 86 in order to reconcile one or more of these inconsistencies. Such modifications may include removing or adding one or more contextual parameters 90 from the set of contextual factors 90 associated with that particular personalizable parameter 86.

Reference is now made to the flowchart in FIG. 12 showing steps of an algorithm 1200 executed by the at least one processor 11 according to which one or more markers of inconsistencies 46 in the set of contextual factors 90 are generated and signaled to the player 1.

At step 1210, the game code 18 consults the memory 12 to identify the set of contextual factors 90 associated with a given personalizable contextual parameter 86.

At step 1220, the game code 18 is configured to generate one or more markers of inconsistencies 46 (i.e., markers of independence, conflict or importance) for each contextual factor CF in the set of contextual factors 90 based at least on a statistical analysis of past player recommendations. The past player recommendations are defined as recommendations provided in one or more coaching sessions previous to a current coaching session during which previous instructions indicative of a previous gameplay action A to be performed by the agent in the gaming environment 8 and previous contextual feedback from the player regarding the previous gameplay action A have been received.

At step 1230, the one or more markers of inconsistencies 46 are stored in the memory 12 as part of the statistical toolbox 34.

At step 1240, the game code 18 may be configured to request player input related to the detected inconsistencies and, in response to received player input, the game code 18 is configured to modify the set of contextual factors 90 associated with the given personalizable contextual parameter 86 in order to reconcile these inconsistencies.

Accordingly, the player 1 may be inconsistent in their recommendations, yet the behavioral model 100 remains robust to inconsistent recommendations. Additionally, given that the player 1 can only modify a portion of the behavioral model 100, namely the personalizable contextual parameters 86 and that the player 1 cannot modify the non-personalizable parameters 88 of the behavioral model 100, the stability of the behavioral model 100 may be retained since only a portion of the overall decision logic associated with the agent may be changed by the player 1. Further, if the player 1 provides uninsightful recommendations, the default set of contextual factors 90d provided by the game designer and associated with a particular personalizable contextual parameter 86 may be relied upon until more insightful recommendations are provided by the player 1 (the default set of contextual factors 90d possibly including all potential contextual factors CF).

VI. Coaching Module 32

In order to prompt the player 1 to identify the relationships between contextual factors CF and personalizable contextual parameters 86, the coaching session may involve a structured dialogue in which the player's recommendations may be obtained by way of any suitable conversational agent as will be described further below with respect to a coaching module 32 of the video game.

Figure 14A:
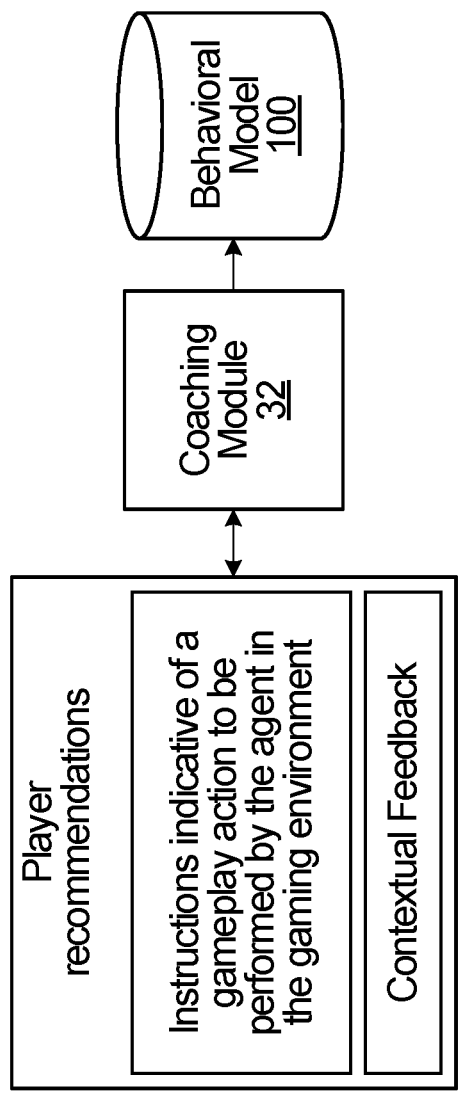
FIGS. 14A and 14B conceptually illustrate a coaching module of the video game, in accordance with a non-limiting embodiment of the present disclosure.

As shown in FIG. 14A, the coaching module 32 interacts with the player 1 to process the player's recommendations in order to adapt the behavioral model 100 in accordance with the player's recommendations. During the coaching session, the coaching module 32 interacts with the player 1 by 'asking' the player 1 for a recommendation as to how the virtual fighter should respond in each specific situation. In addition, the coaching module 32 further interacts with the player 1 by 'asking' the player 1 to answer questions that justify each recommendation provided. The coaching module 32 processes the player's recommendations to identify the portions of the behavioral model 100 to be personalized and then personalizes said portions in accordance with the player's recommendations. The coaching module 32 is thus provided for adapting the behavioral model 100 associated with the virtual fighter based on the player's recommendations including, if applicable, by interfacing with the player 1 when inconsistencies are detected in the player's recommendations.

The coaching module 32 may be any interactive artificial or virtual intelligence component, agent, or other functionality with which the player 1 can interact; in this way, the coaching module 32 is configured to simulate how a human would behave as a conversational partner. The coaching module 32 may be a program, module, utility, agent, or any other software component which manages and conducts conversations via auditory or textual methods to request and process player recommendations as well as adapt the behavioral model 100.

During a coaching session, the coaching module 32 interacts with the player 1 by way of a structured dialogue in which focused dialogue topics are selected by the coaching module 32 based on the given situation. The purpose of the structured dialogue is to request and process player recommendations as well as adapt the behavioral model 100. The coaching module 32 interacts with the player by asking the player to provide their recommendations including their instructions indicative of performable gameplay action A and the contextual feedback regarding the gameplay action A. The coaching module 32 processes the player's recommendations in view of identifying the set of contextual parameters 84 associated with said gameplay action A. The coaching module 32 also processes the player's recommendations in view of identifying a particular contextual parameter from the set of contextual parameters 84 associated with said gameplay action that is a personalizable contextual parameter 86. The coaching module 32 further processes the player's recommendations in view of identifying a particular contextual factor CF from the set of contextual factors 90 associated with the personalizable contextual parameter 86. The coaching module 32 also personalizes the personalizable contextual parameter 86 by creating an association between the particular contextual factor CF and the personalizable contextual parameter 86, such association being stored in the memory 12.

Figure 14B:
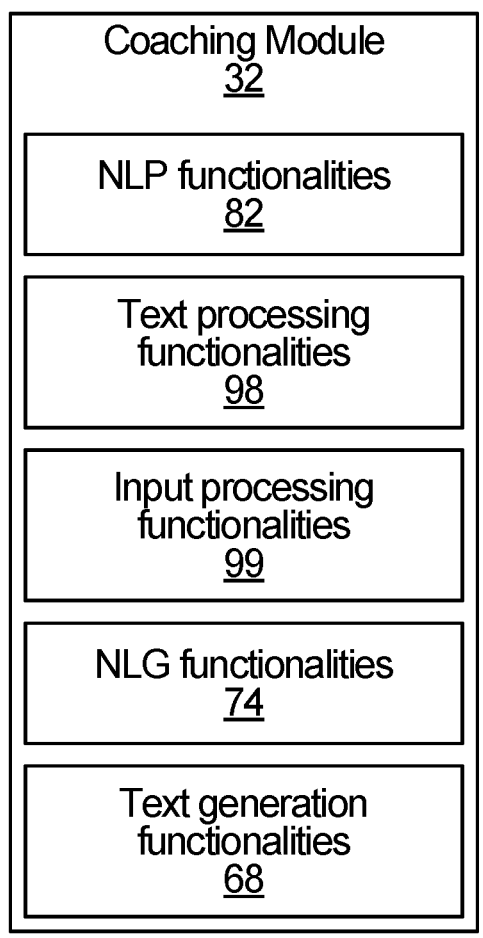

With reference to FIG. 14B, the coaching module 32 is shown to include one more functionalities including natural language processing (NLP) functionalities 82, text processing functionalities 98, input processing functionalities 99, natural language generation (NLG) functionalities 74, text generation functionalities 68, to name a few non-limiting examples.

The coaching module 32 may extract a performable gameplay action A, a particular personalizable contextual parameter 86 and a particular contextual factor CF from the player's recommendations using its NLP functionalities 82, text processing functionalities 98 and/or input processing functionalities 99. The NLP functionalities 82 may be provided by any suitable natural language processing module such as provided by a plurality of web services and backend applications, including IBM's Watson, Google Cloud Natural Language API, Amazon Lex, Microsoft Cognitive Services, as well as any proprietary solution, application, or service.

Alternatively, the coaching module 32 may be configured to read player control commands for selecting an item from the list or menu of performable gameplay actions A, of personalizable contextual parameters 86 and/or of contextual factors CF, using the input processing functionalities 99 of the coaching module 32. The player commands may be provided by the player 1 via a joystick or pressing a button or clicking a mouse or touching a screen to input data, in accordance with a few non-limiting examples.

The NLG functionalities 92 of the coaching module 32 can prepare a natural language response to the received player recommendations in order to engage in dialogue with the player 1. The NLG functionalities 92 can be provided by any suitable NLG engine capable of generating natural language responses, such as Arria NLG, AX Semantics, Yseop, Simplenglg and NaturalOWL, in accordance with a few non-limiting examples.

The coaching module 32 can communicate with components of the video game apparatus 10 to adapt the behavioral model 100, including the memory 12, the processor 11, the game control interface including the internal game controller 13 (e.g., a touchscreen) and/or the external game controller 17 (e.g., a joystick), the display apparatus including the internal display device 15 (e.g., a touchscreen) and/or the external display device 16 (e.g. a computer monitor, a television set).

These example systems or components are not intended to be limiting, and the coaching module 32 may include fewer or more functionalities or components than illustrated or described.

Figure 15A:
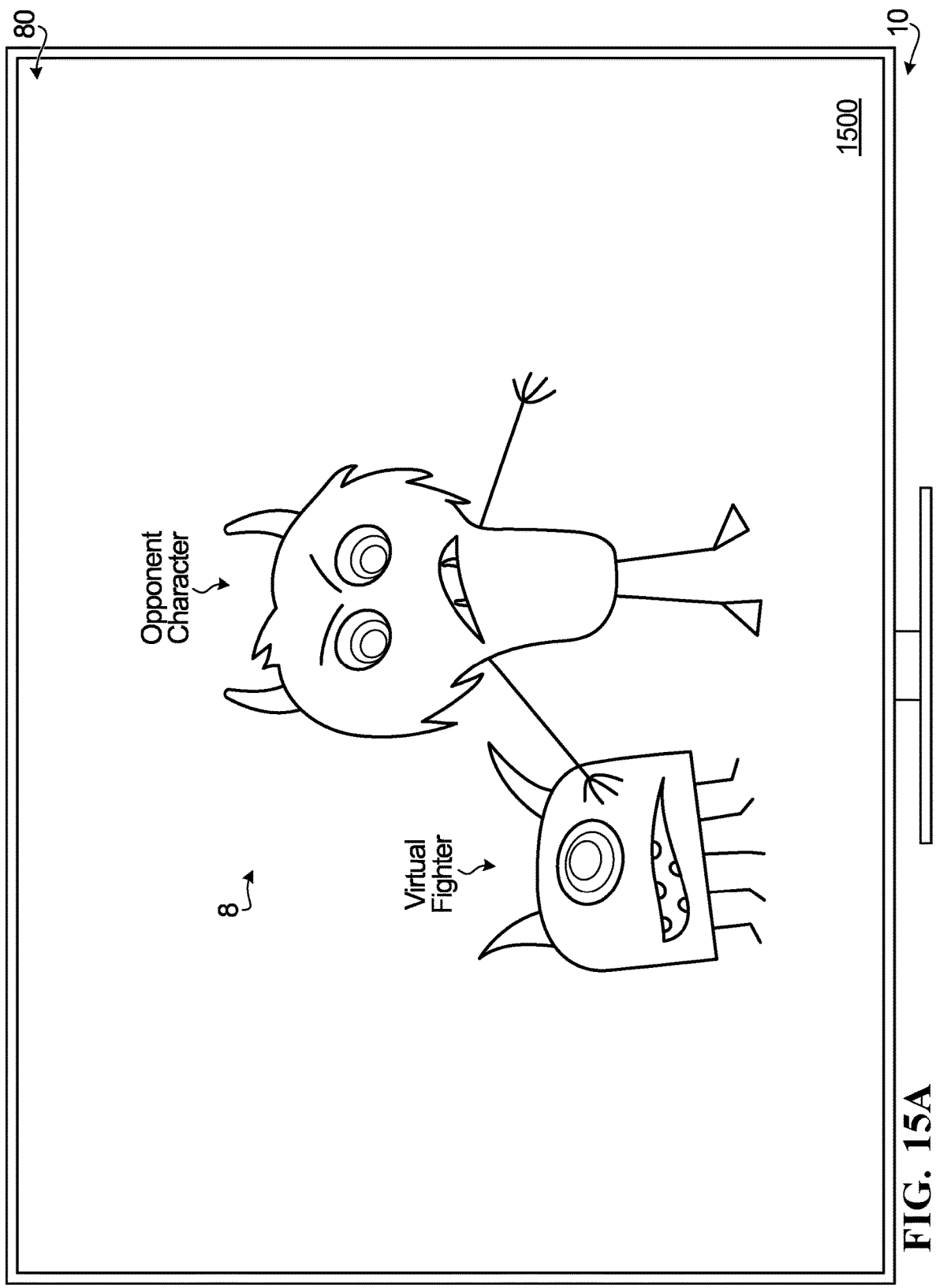

An exemplary interaction between the coaching module 32 and the player 1 is shown in FIGS. 15A to 15H. In FIG. 15A, a scene 1500 is shown in the screen 80 of the video game apparatus 10, in this case, a computer. The scene 1500 is a scene of a coaching session comprising a situation including the virtual fighter and the opponent character in the gaming environment 8.

Figure 15B:
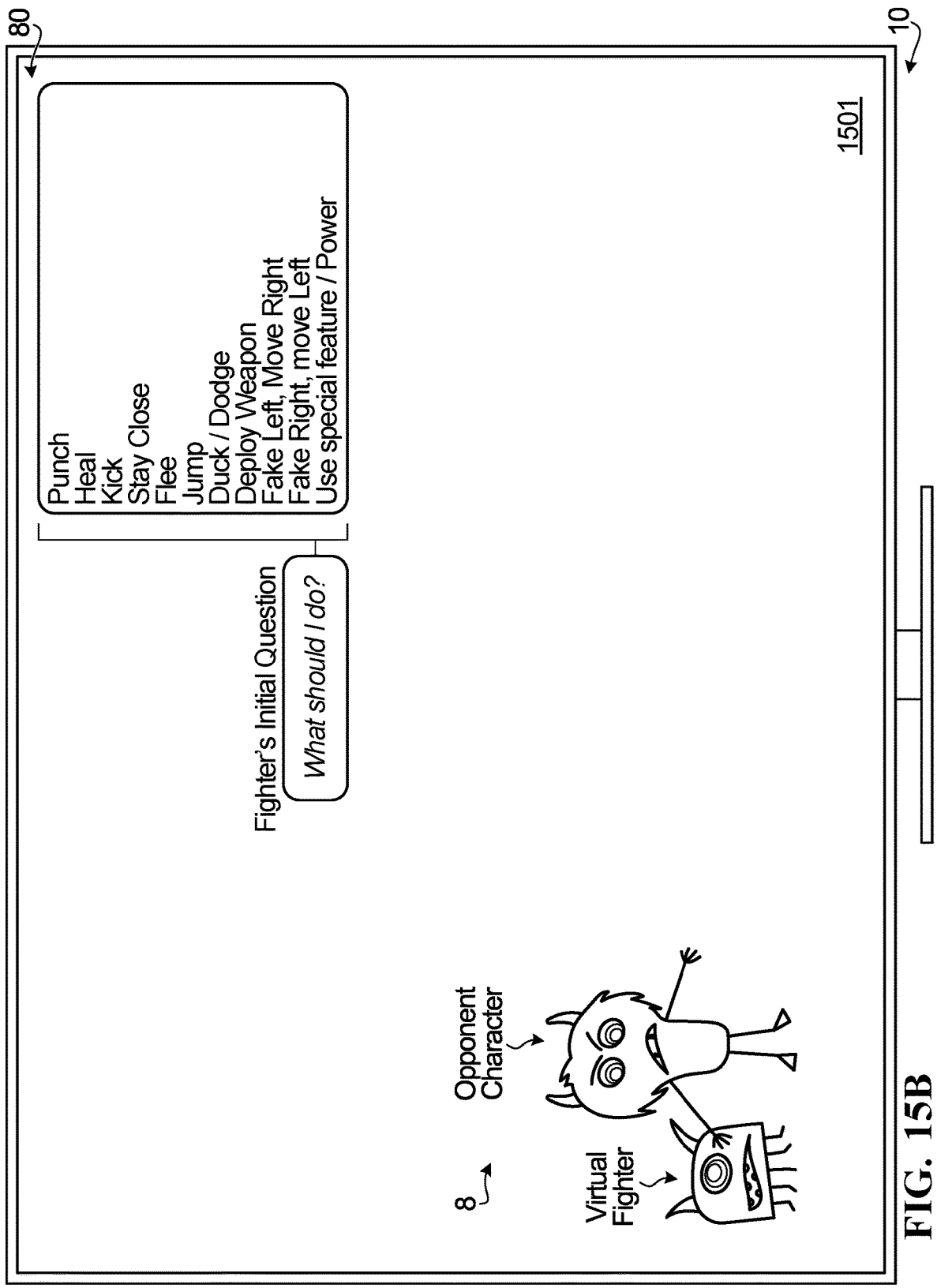

As shown in a scene 1501 including the structured dialogue represented in FIG. 15B, interceding 'on behalf of' the virtual fighter, the coaching module 32 'asks' the player for a recommendation as to how the virtual fighter should respond to the situation by asking the question "[w]hat should I do?"

In essence, the coaching module 32 is asking for instructions from the player 1, the instructions indicative of a gameplay action A performable by the virtual fighter in the gaming environment 8. In this regard, the coaching module 32 accesses the memory 12 to retrieve a list or menu of performable gameplay actions A that the virtual fighter may perform and the coaching module 32 provides this list or menu to the player 1 via the input/output module 14 of the video game apparatus 10.

Figure 15C:
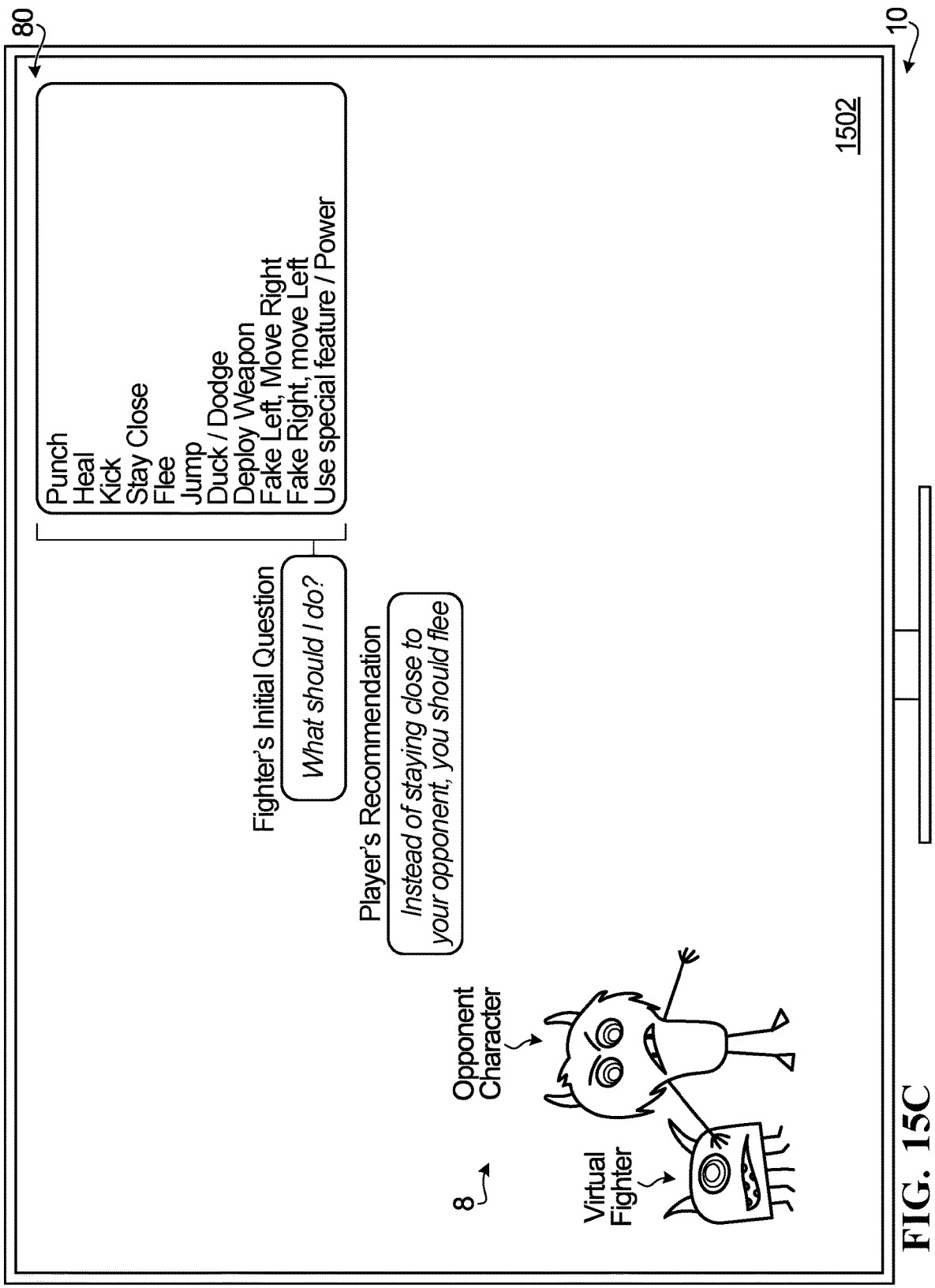

As shown in a scene 1502 including the structured dialogue represented in FIG. 15C, the player 1 responds to the virtual fighter, via the coaching module 32, and provides the recommendation "[i]nstead of staying close to your opponent, you should flee" via an input device of the video game apparatus 10 (e.g., keyboard, display, microphone etc.). Thus, in this case, the player 1 has effectively selected the performable gameplay action flee from the list or menu of performable gameplay actions A. As such, the player's recommendation comprises instructions indicative of a gameplay action A to be performed by the virtual fighter in the gaming environment 8, namely the gameplay action flee.

The coaching module 32, which is in communication with the input devices of the video game apparatus 10 receives the player's recommendation and processes it using its NLP functionalities 82, input processing functionalities 99 and/or text processing functionalities 98. The coaching module 32 is suitably configured to process the response received from the player 1 in view of extracting the appropriate recommendation (e.g., 'flee' and not 'staying close'). Accordingly, the coaching module 32 extracts the instructions indicative of a performable gameplay action A from the player's response.

In this case, the coaching module 32 will extract the instructions indicative of the performable gameplay action flee from the player's response. The coaching module 32 may then access the portion of the behavioral model 100 of the virtual fighter associated with the performable gameplay action flee. At this stage, the virtual fighter, via the coaching module 32, 'seeks to understand' why the player 1 has recommended that the virtual fighter flee in this current situation. In other words, the coaching module 32 seeks to add context to the performable gameplay action flee.

Figure 15D:
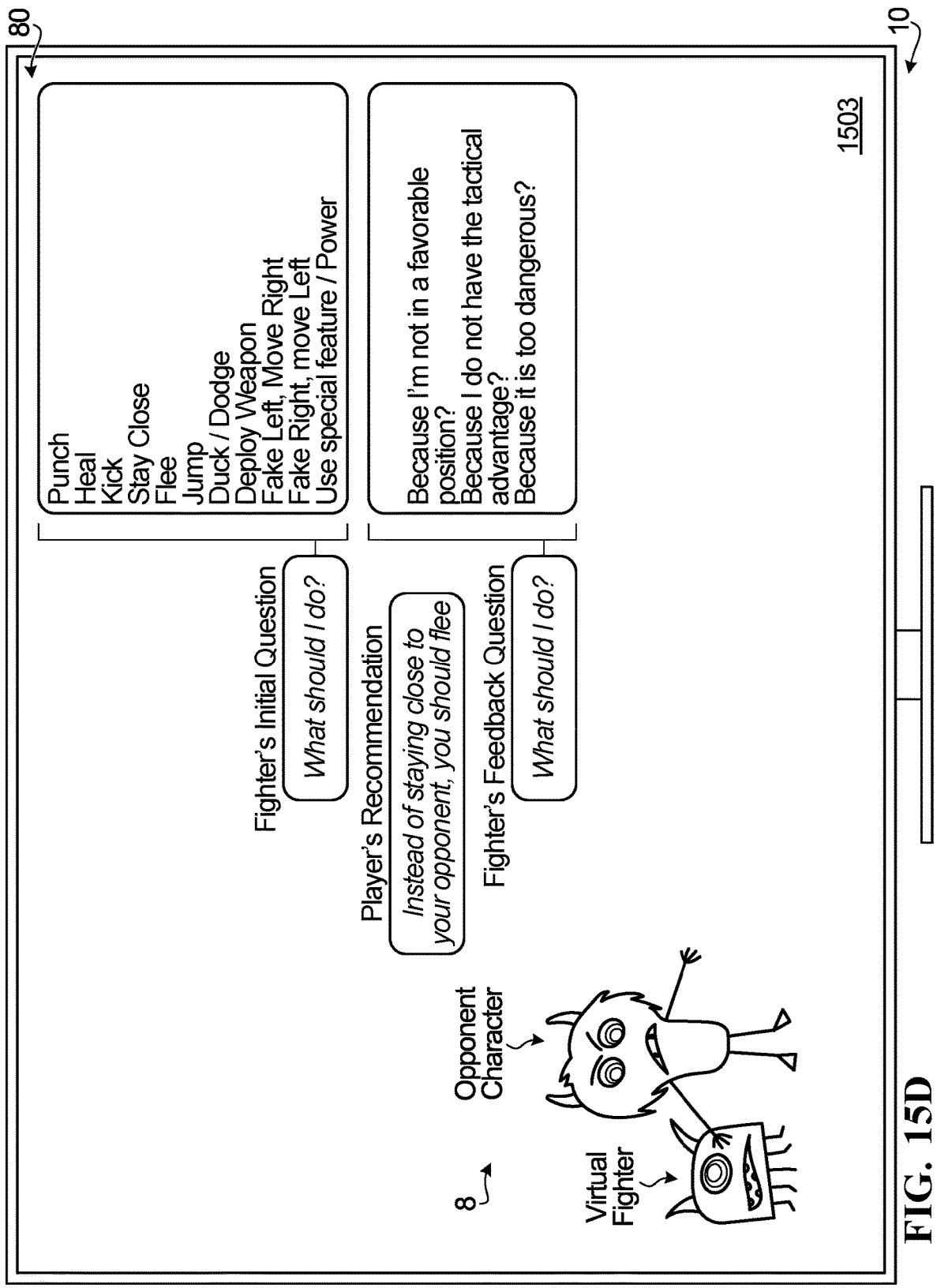

As shown a scene 1503 including the structured dialogue represented in FIG. 15D, interceding 'on behalf of' the virtual fighter, the coaching module 32 'asks' the player 1 to justify the recommendation that the virtual fighter flee. In essence, the coaching module 32 is asking the player 1 to provide contextual feedback related to the performable gameplay action flee, the contextual feedback namely player input related to a contextual parameter that is personalizable. In this regard, the virtual fighter, via the coaching module 32, 'asks' the player 1 why he/she/they should flee by asking the question "[w]hy should I do that?"

In this coaching session, the player 1 is provided with an opportunity to select the contextual feedback from a set of contextual feedback possibilities. Accordingly, the coaching module 32 accesses the memory 12 to retrieve a list or menu of personalizable contextual parameters 86 associated with the performable gameplay action flee and provides this list or menu to the player 1 in a similar fashion as described above with respect to FIG. 15B.

Figure 15E:
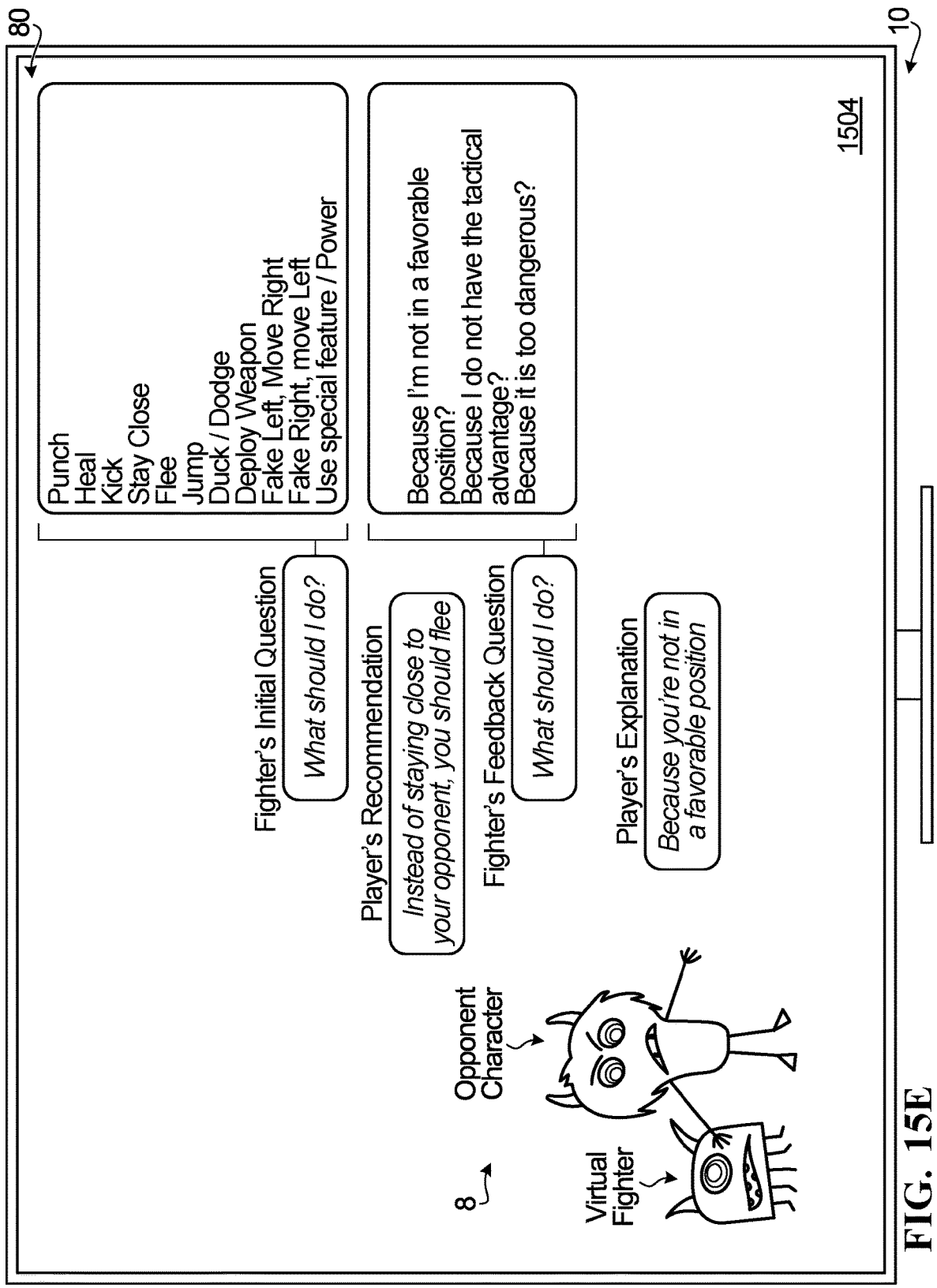

As shown in a scene 1504 including the structured dialogue represented in FIG. 15E, in response to the question "why should I do that" (from the virtual fighter, via the coaching module 32), the player 1 responds "[b]ecause you're not in a favorable position' via an input device of the video game apparatus 10 (e.g., keyboard, display, microphone etc.). Thus, in this case, the player 1 has effectively selected the personalizable contextual parameter [not] favorable position from the list or menu of personalizable contextual parameters 86. As such, the player's recommendation comprises contextual feedback related to the performable gameplay action flee, the contextual feedback being player input related to a contextual parameter that is personalizable.

The coaching module 32, which is in communication with the input devices of the video game apparatus 10 receives the player's recommendation and processes it using its NLP functionalities 82, input processing functionalities 99 and/or text processing functionalities 98. The coaching module 32 is suitably configured to process the response received from the player 1 in view of extracting the appropriate recommendation (e.g., 'favorable position'). Accordingly, the coaching module 32 extracts contextual feedback related to the performable gameplay action flee from the player's response, the contextual feedback being player input related to a contextual parameter that is personalizable (i.e., [not] favorable position).

In this case, the coaching module 32 will extract from the player's response contextual feedback, namely player input related to a contextual parameter that is personalizable, specifically the personalizable contextual parameter [not] favorable position which is related to the gameplay action flee. The coaching module 32 may then access the portion of the behavioral model 100 related to the personalizable contextual parameter [not] favorable position. At this stage, the virtual fighter via the coaching module 32 'seeks to further understand' why the player 1 has assessed that the virtual fighter is not in a favorable position in this current situation. In other words, the coaching module 32 seeks to add context to the personalizable contextual parameter [not] favorable position and thus further context to the performable gameplay action flee.

Figure 15F:
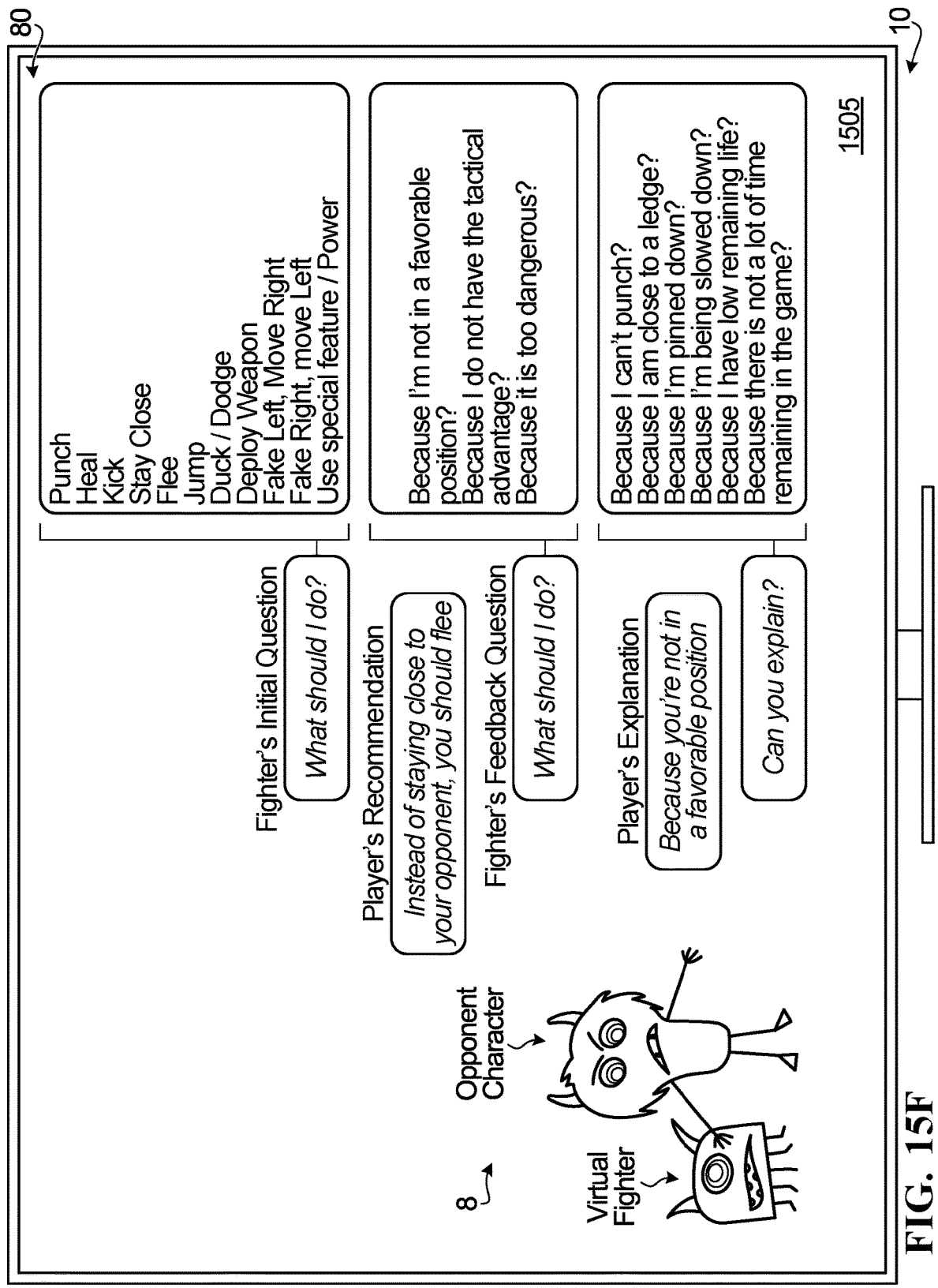

As shown in a scene 1505 including the structured dialogue represented in FIG. 15F, interceding 'on behalf of' the virtual fighter, the coaching module 32 'asks' the player for justify the assessment that the virtual fighter is not in a favorable position. In essence, the coaching module 32 is asking the player 1 to provide additional contextual feedback, more specifically, to provide contextual feedback related to the personalizable contextual parameter [not] favorable position. In this regard, the virtual fighter, via the coaching module 32, 'asks' why he/she is (or they are) not in a favorable position by asking the question "[c]an you explain that?"

In this coaching session, the player 1 is provided with an opportunity to select the additional contextual feedback from a set of contextual feedback possibilities. Accordingly, the coaching module 32 accesses the memory 12 to retrieve a list or menu of potential contextual factors CF and provides this list or menu to the player 1 in a similar fashion as described above with respect to FIG. 15B.

Figure 15G:
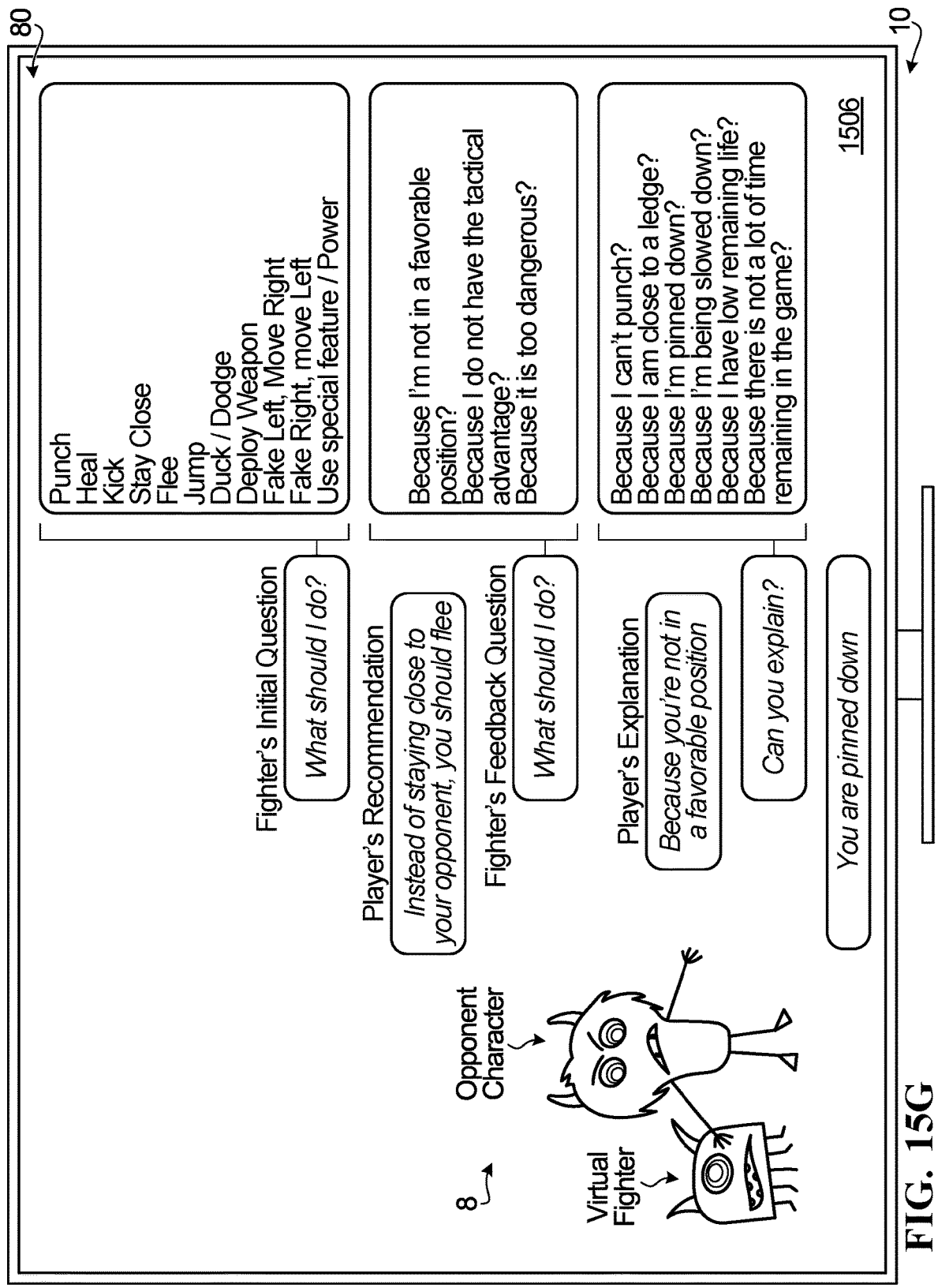

As shown in a scene 1506 including the structured dialogue represented in FIG. 15G, the player 1 responds to the virtual fighter, via the coaching module 32, and provides the response "[b]ecause you are pinned down' via an input device of the video game apparatus 10 (e.g., keyboard, display, microphone etc.). Thus, in this case, the player 1 has effectively selected the contextual factor pinned down from the list or menu of contextual factors CF. As such, the player's recommendation comprises additional contextual feedback, specifically contextual feedback related to the personalizable contextual parameter [not] favorable position.

The coaching module 32, which is in communication with the input devices of the video game apparatus 10 receives the player's recommendation and processes it using its NLP processing functionalities 82, input processing functionalities 99 and/or text processing functionalities 98. The coaching module 32 is suitably configured to process the response received from the player 1 in view of extracting the appropriate recommendation (e.g., 'pinned down'). Accordingly, the coaching module 32 extracts contextual feedback related to the personalizable contextual parameter [not] favorable position from the player's response.

In this case, the coaching module 32 will extract from the player's response contextual feedback, namely player input related a particular contextual factor CF to be associated with a contextual parameter that is personalizable, specifically the contextual factor pinned down personalizable contextual parameter [not] favorable position which is related to the gameplay action flee. At this stage, the coaching module 32 adds the contextual factor pinned down to the set of contextual factors 90 associated with the personalizable contextual parameter [not] favorable position.

Accordingly, through the structured dialogue represented in FIGS. 15A to 15F, the coaching module 32 interprets the player's recommendations to adapt the behavioral model 100 associated with the virtual fighter by tying the contextual factor pinned down to the personalizable contextual parameter [not] favorable position.

Through this structured dialogue which provides a list of performable gameplay actions A, and an indication of a set of contextual feedback possibilities including a list of personalizable contextual parameters 86 and a list of contextual factors CF to select from, a common vocabulary may be enforced such that the player 1 may express himself/herself/themselves using common ontology shared by all game systems which improves the ability of the coaching module 32 to interpret the player's recommendations and explanations. This does not preclude the player from making mistakes in these recommendations and the coaching module 32 is suited to helping the player identify these mistakes, as is now described.

Specifically, in this non-limiting example, let it be assumed that in a previous coaching session (or sessions), the player 1 has associated four contextual factors 90 with the personalizable contextual parameter [not] favorable position, namely: low life, [not] long remaining time, pinned down, slowed down.

As previously mentioned, each contextual factor CF in the set of contextual factors 90 is associated with one or more of the game state variables 92 and the values associated with the one or more of the game state variables 92 is tracked by the game code 18 as part of the current game data 50.

The statistical analysis described above may reveal one or more markers of inconsistencies 46 as previously described. In this case, the coaching module 32 is also configured to validate detected inconsistencies with the player 1 and may requests confirmation to make changes to the set of contextual factors 90 further to inconsistencies being detected.

In this case, the coaching module 32 may access the memory 12 in order to retrieve the statistical toolbox 34 shown in FIGS. 13A and 13B and the game code 18 may be configured to display the statistical toolbox 34 on the screen 80 of the video game apparatus 10. The statistical toolbox 34 is displayed to the player 1 to provide the player 1 with information about the impact of each recommendation that has been provided on the behavioral model 100 by translating detected inconsistencies into questions that the player 1 must answer.

As shown in a scene 1507 in FIG. 15H, the coaching module 32 may ask the player 1 one or more questions based on the markers of inconsistences 46 associated with the contextual factors CF associated with the personalizable contextual parameters favorable position and [not] favorable position. These questions alert the player 1 to the inconsistencies in the set of contextual factors 90 so that they may be resolved.

The set of contextual factors 90 associated with the personalizable contextual parameter favorable position may be modified further the player's response to these questions.

For example, the player 1 may choose to remove the contextual factor low life and [not] long remaining time from the set of contextual factors 90 associated with the personalizable contextual parameter favorable position.

Additionally, the player 1 may choose not to address the detected inconsistencies. For example, the player 1 may choose not to take any action with respect to perceived redundancy of the contextual factors slowed down and pinned down associated with the personalizable contextual parameter [not] favorable position as the player 1 may assess that these contextual factors are not redundant and are indeed independent.

VII. Video Game Process

Figure 16:
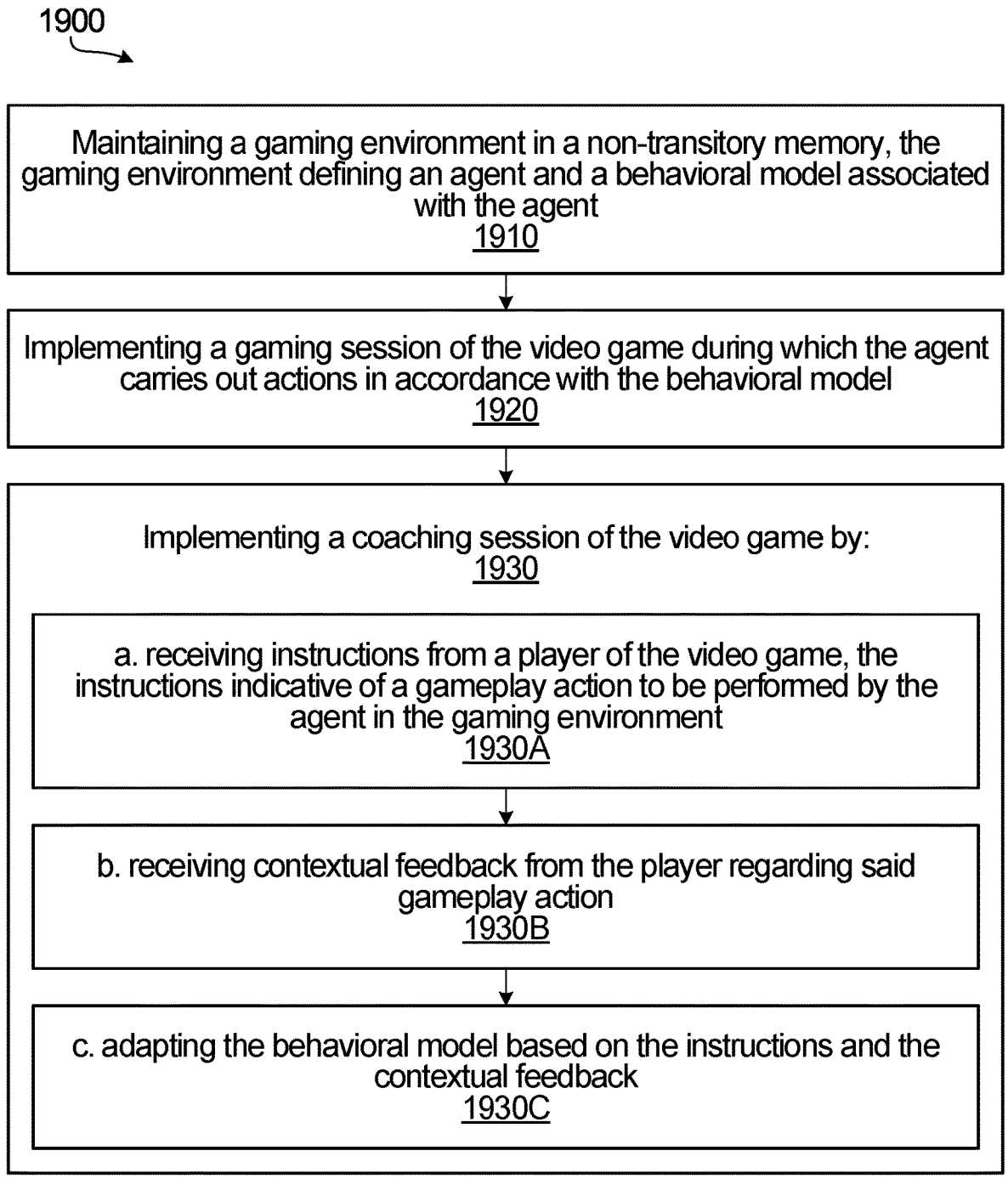
FIG. 16 is a flowchart illustrating steps of a video game process, in accordance with a non-limiting embodiment of the present disclosure.

It should be appreciated that the foregoing has disclosed, inter alia, a method of operating a computer for carrying out a video game, the method being for execution by at least one processor. With reference to the flowchart in FIG. 16, the method 1900 can be described as having a plurality of steps, which do not have to be carried out in the illustrated order. At step 1910, the method includes maintaining a gaming environment in a non-transitory memory, the gaming environment defining an autonomous agent and a behavioral model associated with the agent. At step 1920, the method includes implementing a gaming session of the video game during which the agent carries out actions in accordance with the behavioral model. At step 1930, the method includes implementing a coaching session of the video game. Implementing a coaching session of the video game includes substep 1930A for receiving instructions from a player of the video game, the instructions indicative of a gameplay action to be performed by the agent in the gaming environment. Implementing a coaching session of the video game further includes substep 1930B which comprises receiving contextual feedback from the player regarding said gameplay action. Implementing a coaching session of the video game further includes substep 1930C which comprises adapting the behavioral model based on the instructions and the contextual feedback.

VIII. Additional Remarks

As a result of the above-described methods, systems and applications, a new video game paradigm has been described according to which an agent is coached during a coaching session to adopt a certain behavior; this behavior is then exhibited by the agent during a subsequent gaming session.

As previously mentioned, aspects of the present disclosure relate to adapting (i.e., training) the machine learning based behavioral model 100 to 'control the behavior' of an agent based on data obtained during interactions with the player 1. Typically, training such a machine learning based model requires a large amount of data to cover, for example, the potentially very large number of unique game scenarios that may be encountered within a given video game. In typical cases, a large number of player interactions would be required to yield this large amount of data. However, in this case, the need for large amounts of interactions with the player 1 is reduced by efficiently structuring the interactions with the player 1.

As described above, player interactions may include providing the player 1 with a list of performable gameplay actions A, a list of personalizable contextual parameters 86 and a list contextual factors CF to select from. Providing these lists to the player 1 effectively limits what is asked from the player 1 in order to simplify the process of extracting data from the player's recommendations. This therefore simplifies the adapting of the behavioral model 100 and therefore reduces the data requirements for training the behavioral model 100 which in turns reduces the number of player interactions required to train the behavioral model 100.

Providing these lists has the added benefit of enforcing a common vocabulary across all game systems such that the player 1 may express himself/herself/themselves using common ontology shared by all game systems. This consistency improves the interpretability of the player's recommendations and therefore reduces the data requirements for training the behavioral model 100 which in turns reduces the number of player interactions required to train the behavioral model 100. Furthermore, the behavioral model 100 may use a logistic regression model that is known to be fast to train and is known to be data efficient. Of course, any suitable model may be implemented.

Furthermore, aspects of the present disclosure combine machine learning with game artificial intelligence (AI) by using a scoring-based decision system to interface game AI with machine learning. Such an interface allows game AI to be interoperable with machine learning in order to yield a stable, interpretable, generalizable and evolvable behavioral model 100.

Aspects of the present disclosure may be applicable to any genre of video game. For example, the video game may be one of a shooter game (such as a first person shooter game (FPS) or third person shooter game (TPS)), an action game, an action-adventure game, a simulation game, a puzzle game, a strategy game, a sports game, a competitive game, a role-playing game, or any other type of video game. Aspects of the present disclosure may also be applicable to non-gaming virtual environments such as simulation-based training environments (e.g., aircraft simulation, racing simulation etc.).

The description and drawings merely illustrate various principles. It will thus be appreciated that those skilled in the art will be able to devise various arrangements that, although not explicitly described or shown herein, embody such principles and are included within its scope, as defined in the appended claims.

Furthermore, all examples recited herein are intended to aid the reader in understanding such principles and are to be construed as being without limitation to the recited examples.

Those skilled in the art will appreciate that when a processor is described as being "configured" to carry out an action or process, this can mean that the processor carries out the action or process by virtue of executing computer-readable instructions that are read from device memory where these computer-readable instructions are stored.

Those skilled in the art should appreciate that any feature of any embodiment disclosed herein may combined with (e.g., used instead of or in addition to) any feature of any other embodiment disclosed herein in some examples of implementation. Certain additional elements that may be needed for operation of some embodiments have not been described or illustrated as they are assumed to be within a purview of those ordinarily skilled in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those ordinarily skill in the art.

The invention claimed is:

1. A method of operating a computer for carrying out a video game, the method comprising:
   maintaining a gaming environment in a non-transitory memory of the computer, the gaming environment defining an autonomous agent, a behavioral model associated with the agent and current game data;
   implementing a gaming session of the video game during which the autonomous agent carries out actions in accordance with the behavioral model; and
   implementing a coaching session of the video game by:
   a. receiving instructions from a player of the video game, the instructions indicative of a gameplay action that the player wants performed by the autonomous agent in the gaming environment;
   b. receiving contextual feedback from the player regarding said gameplay action; and
   c. adapting the behavioral model based on the instructions and the contextual feedback, wherein outputs of the behavioral model comprise an indicator for each performable gameplay action of a plurality of performable gameplay actions, the indicator for a particular performable gameplay action includes a preference score associated with the particular performable gameplay action, the preference score associated with the particular performable gameplay action is computed based on a set of contextual parameters associated with the particular performable gameplay action, the current game data comprises a plurality of game state variables, each contextual parameter in the set of contextual parameters is associated with a set of contextual factors, and each contextual factor in the set of contextual factors is associated with one or more of the plurality of game state variables;

the method further comprising:
a. generating a contextual parameter aggregate for each given contextual parameter in the set of contextual parameters associated with the particular performable gameplay action based on (i) a contextual factor value for each given contextual factor in the set of contextual factors associated with the given contextual parameter and (ii) a weight associated with each given contextual factor, the weight being indicative of a contribution of the contextual factor value to the contextual parameter aggregate, wherein the contextual factor value for each given contextual factor in the set of contextual factors associated with the given contextual parameter is based on values of the game state variables associated with the given contextual factor; and
b. computing the preference score associated with the performable gameplay action by combining each said contextual parameter aggregate for each given contextual parameter in the set of contextual parameters associated with the particular performable gameplay action.

2. The method of claim 1, wherein the behavioral model includes inputs and the outputs, wherein the inputs of the behavioral model comprise the current game data.

3. The method of claim 1, wherein the behavioral model is configured to compute the indicator for each of the performable gameplay actions based on the current game data.

4. The method of claim 1, wherein the preference score is indicative of the player's preference for the particular performable gameplay action given the current game data.

5. The method of claim 1, wherein the method further comprises, during the gaming session, identifying the performable gameplay action having the highest preference score, wherein at least one of the actions carried out by the autonomous agent in accordance with the behavioral model comprises the performable gameplay action having the highest preference score.

6. The method of claim 4, wherein the method further comprises, during the gaming session, identifying a subset of performable gameplay actions each having the highest preference score, wherein at least one of the actions carried out by the autonomous agent in accordance with the behavioral model comprises a randomly selected one of the performable gameplay actions selected in the subset of performable gameplay actions.

7. The method of claim 5, wherein said identifying the performable gameplay action having the highest preference score is carried out continuously, periodically or based on occurrence of an event.

8. The method of claim 5, wherein the performable gameplay action having the highest preference score changes dynamically.

9. The method of claim 1, wherein each contextual parameter in the set of contextual parameters reflects a parameter to be assessed by the autonomous agent to determine if a particular performable gameplay action should be carried out during a gaming session given the current game data.

10. The method of claim 1, wherein said combining comprises summing, averaging or linearly combining.

11. The method of claim 10, wherein said linearly combining includes associating a coefficient with each said contextual parameter aggregate, the coefficient being indicative of relative importance of the contextual parameters in the set of contextual parameters.

12. The method of claim 1, wherein implementing a coaching session of the video game by adapting the behavioral model comprises:
based on the instructions indicative of a gameplay action that the player wants performed by the autonomous agent in the gaming environment, identifying the set of contextual parameters associated with said gameplay action.

13. The method of claim 12, wherein said adapting the behavioral model further comprises, based on the contextual feedback:
a. identifying a particular contextual parameter from the set of contextual parameters associated with said gameplay action that is a personalizable contextual parameter;
b. identifying a particular contextual factor to be associated with the personalizable contextual parameter; and
c. personalizing the personalizable contextual parameter by creating an association between the particular contextual factor and the personalizable contextual parameter, the association being stored in memory.

14. The method of claim 13, wherein the particular contextual factor is indicative of the player's interpretation of the associated personalizable contextual parameter.

15. The method of claim 13, wherein personalizing the personalizable contextual parameter comprises modifying the weight associated with the particular contextual factor.

16. The method of claim 13, wherein the contextual feedback comprises player input related to (i) a contextual parameter that is personalizable or (ii) a particular contextual factor to be associated with a contextual parameter that is personalizable.

17. The method of claim 1, wherein implementing the coaching session further comprises, prior to the receiving instructions, providing the player with an indication of the performable gameplay actions that the autonomous agent can be instructed to carry out.

18. The method of claim 1, wherein the coaching session is a first coaching session, the player is a first player, the instructions are first instructions, the gameplay action is a first gameplay action and the contextual feedback is first contextual feedback, the method further comprising implementing a second coaching session of the video game by:
receiving second instructions from a second player of the video game, the second instructions indicative of a second gameplay action that the second player wants performed by the autonomous agent in the gaming environment;
receiving second contextual feedback from the second player regarding said second gameplay action; and
adapting the behavioral model based on the second instructions and the second contextual feedback,
wherein the first and the second gameplay actions are the same and wherein the first and the second contextual feedback are different.

19. The method of claim 1, wherein implementing the coaching session further comprises providing the player with an opportunity to select the contextual feedback from a set of contextual feedback options.

20. The method of claim 19, wherein the coaching session is a current coaching session preceded by at least one previous coaching session in which previous instructions indicative of a previous gameplay action that the player wants performed by the autonomous agent in the gaming environment and previous contextual feedback from the player regarding the previous gameplay action have been received, the previous instructions and contextual feedback being part of a set of past player recommendations, and
wherein the method further comprises generating one or more markers of inconsistencies in the set of contextual factors, and wherein generating the one or more markers of inconsistencies comprises:
a. identifying the set of contextual factors associated with a given personalizable contextual parameter;
b. generating the one or more markers of inconsistencies for each contextual factor in the set of contextual factors based at least on a statistical analysis of the set of past player recommendations;
c. storing the one or more markers of inconsistencies in memory.

21. The method of claim 20, wherein the one or more markers of inconsistencies comprise one or more of a marker of conflict, a marker of importance or a marker of independence.

22. The method of claim 21, wherein further to generating the one or more markers of inconsistencies, the method further comprises requesting player input related to the one or more markers of inconsistencies and in response to the player input related to the one or more markers of inconsistences, modifying the set of contextual factors associated with the given personalizable contextual parameter.

23. The method of claim 22, wherein modifying the set of contextual factors associated with the given personalizable contextual parameter comprises removing a contextual factor from the set of contextual factors or adding a contextual factor to the set of contextual factors.

24. The method of claim 1, wherein implementing the coaching session comprises executing a graphical user interface configured to provide the player with an opportunity to enter the instructions and the contextual feedback.

25. The method of claim 24, wherein the graphical user interface is configured to interact with the player by way of a structured dialogue.

26. A non-transitory computer-readable storage medium comprising computer-readable instructions which, when read and executed by at least one processor, cause the at least one processor to execute a method of operating a computer for carrying out a video game, wherein the method comprises:
maintaining a gaming environment in a non-transitory memory of the computer, the gaming environment defining an autonomous agent, a behavioral model associated with the agent and current game data;
implementing a gaming session of the video game during which the autonomous agent carries out actions in accordance with the behavioral model; and
implementing a coaching session of the video game by:
a. receiving instructions from a player of the video game, the instructions indicative of a gameplay action that the player wants performed by the autonomous agent in the gaming environment;
b. receiving contextual feedback from the player regarding said gameplay action; and
c. adapting the behavioral model based on the instructions and the contextual feedback, wherein outputs of the behavioral model comprise an indicator for each performable gameplay action of a plurality of performable gameplay actions, the indicator for a particular performable gameplay action includes a preference score associated with the particular performable gameplay action, the preference score associated with the particular performable gameplay action is computed based on a set of contextual parameters associated with the particular performable gameplay action, the current game data comprises a plurality of game state variables, each contextual parameter in the set of contextual parameters is associated with a set of contextual factors, and each contextual factor in the set of contextual factors is associated with one or more of the plurality of game state variables;
the method further comprising:
a. generating a contextual parameter aggregate for each given contextual parameter in the set of contextual parameters associated with the particular performable gameplay action based on (i) a contextual factor value for each given contextual factor in the set of contextual factors associated with the given contextual parameter and (ii) a weight associated with each given contextual factor, the weight being indicative of a contribution of the contextual factor value to the contextual parameter aggregate, wherein the contextual factor value for each given contextual factor in the set of contextual factors associated with the given contextual parameter is based on values of the game state variables associated with the given contextual factor; and
b. computing the preference score associated with the performable gameplay action by combining each said contextual parameter aggregate for each given contextual parameter in the set of contextual parameters associated with the particular performable gameplay action.

27. A video game apparatus comprising:
at least one processor;
a memory storing instructions for execution by the at least one processor; and
at least one input device configured to receive input from a player, at least one output device configured for providing output to the player,
wherein the at least one processor is configured to execute the instructions in the memory for implementing an interactive computer program that generates the output in response to the received input and, the interactive computer program including at least one process that comprises:
maintaining a gaming environment in a non-transitory memory of the computer, the gaming environment defining an autonomous agent, a behavioral model associated with the agent and current game data;
implementing a gaming session of the video game during which the autonomous agent carries out actions in accordance with the behavioral model; and
implementing a coaching session of the video game by:
a. receiving instructions from a player of the video game, the instructions indicative of a gameplay action that the player wants performed by the autonomous agent in the gaming environment;
b. receiving contextual feedback from the player regarding said gameplay action; and c. adapting the behavioral model based on the instructions and the contextual feedback, wherein outputs of the behavioral model comprise an indicator for each performable gameplay action of a plurality of performable gameplay actions, the indicator for a particular performable gameplay action includes a preference score associated with the particular performable gameplay action, the preference score associated with the particular performable gameplay action is computed based on a set of contextual parameters associated with the particular performable gameplay action, the current game data comprises a plurality of game state variables, each contextual parameter in the set of contextual parameters is associated with a set of contextual factors, and each contextual factor in the set of contextual factors is associated with one or more of the plurality of game state variables, and the at least one process further comprises:

c. generating a contextual parameter aggregate for each given contextual parameter in the set of contextual parameters associated with the particular performable gameplay action based on (i) a contextual factor value for each given contextual factor in the set of contextual factors associated with the given contextual parameter and (ii) a weight associated with each given contextual factor, the weight being indicative of a contribution of the contextual factor value to the contextual parameter aggregate, wherein the contextual factor value for each given contextual factor in the set of contextual factors associated with the given contextual parameter is based on values of the game state variables associated with the given contextual factor; and computing the preference score associated with the performable gameplay action by combining each said contextual parameter aggregate for each given contextual parameter in the set of contextual parameters associated with the particular performable gameplay action.

* * * * *